(12) United States Patent
Kawasaki et al.

(10) Patent No.: US 8,097,309 B2
(45) Date of Patent: Jan. 17, 2012

(54) LIQUID CRYSTAL COMPOSITION AND LIQUID CRYSTAL DISPLAY DEVICE

(75) Inventors: Subaru Kawasaki, Ichihara (JP); Norikatsu Hattori, Ichihara (JP)

(73) Assignees: JNC Corporation Inc., Tokyo (JP); Chisso Petrochemical Corporation, Tokyo (JP)

( * ) Notice: Subject to any disclaimer, the term of this patent is extended or adjusted under 35 U.S.C. 154(b) by 35 days.

(21) Appl. No.: 12/819,048

(22) Filed: Jun. 18, 2010

(65) Prior Publication Data

US 2011/0043747 A1 Feb. 24, 2011

(30) Foreign Application Priority Data

Aug. 19, 2009 (JP) ................. 2009-189709

(51) Int. Cl.
*C09K 19/32* (2006.01)
*C09K 19/34* (2006.01)
*C09K 19/30* (2006.01)
*C09K 19/12* (2006.01)
*C09K 19/20* (2006.01)

(52) U.S. Cl. ............ 428/1.1; 252/299.61; 252/299.62; 252/299.63; 252/299.66; 252/299.67

(58) Field of Classification Search ............. 428/1.1; 252/299.61, 299.62, 299.63, 299.66, 299.67
See application file for complete search history.

(56) References Cited

FOREIGN PATENT DOCUMENTS

| JP | 2001-034197 | | | 2/2001 |
|---|---|---|---|---|
| JP | 2001-040354 | | | 2/2001 |
| JP | 2001039902 | A | * | 2/2001 |
| JP | 2001039903 | A | * | 2/2001 |
| WO | WO 2011021525 | A1 | * | 2/2011 |

* cited by examiner

*Primary Examiner* — Shean Wu
(74) *Attorney, Agent, or Firm* — Hogan Lovells US LLP

(57) ABSTRACT

The subject is to provide a liquid crystal composition that satisfies at least one characteristic among characteristics such as a high maximum temperature of a nematic phase, a low minimum temperature of a nematic phase, a small viscosity, a suitable optical anisotropy, a negatively large dielectric anisotropy, a large specific resistance, a high stability to ultraviolet light and a high stability to heat, or that is suitably balanced regarding two or more characteristics. The other subject is to provide an AM device that has a short response time, a high voltage holding ratio, a high contrast ratio, a long service life and so forth.

The invention provides a liquid crystal composition that has negative dielectric anisotropy, including a specific compound having a negatively large dielectric anisotropy as a first component and a two-ring compound having a small viscosity as a second component, and may optionally including a specific compound having a small viscosity as a third component and/or a specific compound having a negatively large dielectric anisotropy as a fourth component, and provides a liquid crystal display device containing the composition.

19 Claims, No Drawings

US 8,097,309 B2

LIQUID CRYSTAL COMPOSITION AND LIQUID CRYSTAL DISPLAY DEVICE

BACKGROUND OF THE INVENTION

1. Field of the Invention

The invention relates mainly to a liquid crystal composition suitable for use in an active matrix device, and an AM device containing the composition. More specifically, the invention relates to a liquid crystal composition having negative dielectric anisotropy, and a device containing the composition and having a mode such as in-plane switching, vertical alignment or polymer sustained alignment.

2. Related Art

In a liquid crystal display device, a classification based on an operating mode for liquid crystals includes phase change (PC), twisted nematic (TN), super twisted nematic (STN), electrically controlled birefringence (ECR), optically compensated bend (On), in-plane switching (IPS), vertical alignment (VA) and polymer sustained alignment (PSA). A classification based on a driving mode in the device includes a passive matrix (PM) and an active matrix (AM). The PM is further classified into static, multiplex and so forth, and the AM is classified into a thin film transistor (TFT), a metal-insulator-metal (MIM) and so forth. The TFT is further classified into amorphous silicon and polycrystal silicon. The latter is classified into a high temperature type and a low temperature type according to the production process. A classification based on a light source includes a reflection type utilizing natural light, a transmission type utilizing a backlight and a semi-transmission type utilizing both natural light and a backlight.

These devices contain a liquid crystal composition having suitable characteristics. The liquid crystal composition has a nematic phase. General characteristics of the composition should be improved to give an AM device having good general characteristics. Table 1 below summarizes the relationship between the general characteristics of the two. The general characteristics of the composition will be explained further based on a commercially available AM device. The temperature range of a nematic phase relates to the temperature range in which the device can be used. A desirable maximum temperature of the nematic phase is approximately 70° C. or higher and a desirable minimum temperature of the nematic phase is approximately −10° C. or lower. The viscosity of the composition relates to the response time of the device. A short response time is desirable for displaying moving images on the device. Accordingly, a small viscosity of the composition is desirable. A small viscosity at a low temperature is more desirable.

TABLE 1

General Characteristics of Liquid Crystal Composition and AM Device

| No. | General Characteristics of Composition | General Characteristics of AM Device |
| --- | --- | --- |
| 1 | wide temperature range of a nematic phase | wide usable temperature range |
| 2 | small viscosity[1] | short response time |
| 3 | suitable optical anisotropy | large contrast ratio |
| 4 | positively or negatively large dielectric anisotropy | low threshold voltage and small electric power consumption large contrast ratio |
| 5 | large specific resistance | large voltage holding ratio and large contrast ratio |
| 6 | high stability to ultraviolet light and heat | long service life |

[1] A liquid crystal composition can be injected into a liquid crystal cell in a shorter period of time.

The optical anisotropy of the composition relates to the contrast ratio of the device. The product (Δn×d) of the optical anisotropy (Δn) of the composition and the cell gap (d) of the device is designed so as to maximize the contrast ratio. A suitable value of the product depends on the kind of operating modes. In a device having a VA mode, a suitable value is in the range of approximately 0.30 µm to approximately 0.40 µm. In a device having an IPS mode, a suitable value is in the range of approximately 0.20 µm to approximately 0.30 µm. In this case, a composition having a large optical anisotropy is desirable for a device having a small cell gap. The dielectric anisotropy having a large absolute value in the composition contributes to a low threshold voltage, a small electric power consumption and a high contrast ratio of the device. Accordingly, the dielectric anisotropy having a large absolute value is desirable. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance is desirable at room temperature and also at a high temperature after it has been used for a long time. The stability of the composition to ultraviolet light and heat relates to the service life of the liquid crystal display device. In the case where the stability is high, the device has a long service life. These characteristics are desirable for an AM device used in a liquid crystal projector, a liquid crystal television and so forth.

A composition having positive dielectric anisotropy is used for an AM device having a TN mode. On the other hand, a composition having negative dielectric anisotropy is used for an AM device having a VA mode. A composition having positive or negative dielectric anisotropy is used for an AM device having an IPS mode. A composition having positive or negative dielectric anisotropy is used for an AM device having a PSA mode. Examples of the liquid crystal composition having negative dielectric anisotropy are disclosed in the following patent documents Nos. 1 to 2.

No. 1: JP 2001-34197 A and No. 2: JP 2001-40354 A.

A desirable AM device has characteristics such as a wide temperature range in which the device can be used, a short response time, a large contrast ratio, a low threshold voltage, a large voltage holding ratio and a long service life. Response time is desirably shorter even by one millisecond Thus, a composition having characteristics such as a high maximum temperature of a nematic phase, a low minimum temperature of a nematic phase, a small viscosity, a suitable optical anisotropy, a positively or negatively large dielectric anisotropy, a large specific resistance, a high stability to ultraviolet light and a high stability to heat is especially desirable.

SUMMARY OF THE INVENTION

The invention concerns a liquid crystal composition that has negative dielectric anisotropy, including two components, wherein a first component is at least one compound selected from the group of compounds represented by formula (1), and a second component is at least one compound selected from the group of compounds represented by formula (2), and a liquid crystal display device containing the composition:

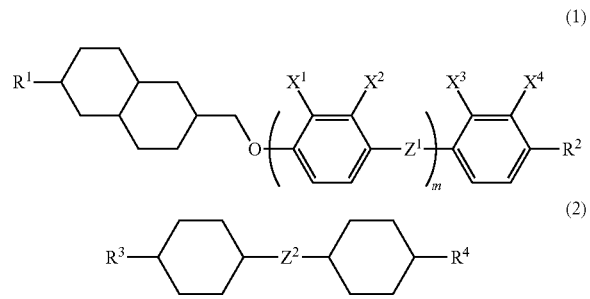

wherein $R^1$, $R^2$, $R^3$ and $R^4$ are each independently alkyl having 1 to 12 carbons, alkoxy having 1 to 12 carbons, alkenyl having 2 to 12 carbons, alkenyloxy having 2 to 11 carbons or alkenyl having 2 to 12 carbons in which arbitrary hydrogen is replaced by fluorine; $X^1$ and $X^2$ are each independently hydrogen, fluorine or chlorine; $X^3$ and $X^4$ are each independently fluorine or chlorine; $Z^1$ and $Z^2$ are each independently a single bond, ethylene, methyleneoxy, oxymethylene, carbonyloxy or oxycarbonyl; and m is 0 or 1.

DETAILED DESCRIPTION OF THE INVENTION

The terms used in the specification and claims are defined as follows. The liquid crystal composition and the liquid crystal display device of the invention may occasionally be abbreviated to "the composition" and "the device," respectively. "A liquid crystal display device" is a generic term for a liquid crystal display panel and a liquid crystal display module. "A liquid crystal compound" is a generic term for a compound having a liquid crystal phase such as a nematic phase and a smectic phase, and also for a compound having no liquid crystal phases but being useful as a component of a composition. The useful compound has a six-membered ring such as 1,4-cyclohexylene and 1,4-phenylene, and a rod-like molecular structure. An optically active compound and a polymerizable compound may occasionally be added to the composition. Even in the case where these compounds are liquid crystal compounds, the compounds are classified as an additive herein. At least one compound selected from the group of compounds represented by formula (1) may occasionally be abbreviated to "the compound (1)." "The compound (1)" means one compound, or two or more compounds represented by formula (1). The same rules apply, to compounds represented by the other formulas. "Arbitrary" is used not only in cases when the position is arbitrary but also in cases when the number is arbitrary. However, it is not used in cases when the number is 0 (zero).

A higher limit of the temperature range of a nematic phase may occasionally be abbreviated to "the maximum temperature." A lower limit of the temperature range of a nematic phase may occasionally be abbreviated to "the minimum temperature." That "specific resistance is large" means that a composition has a large specific resistance at room temperature and also at a temperature close to the maximum temperature of a nematic phase in the initial stage, and that the composition has a large specific resistance at room temperature and also at a temperature close to the maximum temperature of a nematic phase even after it has been used for a long time. That "a voltage holding ratio is large" means that a device has a large voltage holding ratio at room temperature and also at a temperature close to the maximum temperature of a nematic phase in the initial stage, and that the device has a large voltage holding ratio at room temperature and also at a temperature close to the maximum temperature of a nematic phase even after it has been used for a long time. When characteristics such as optical anisotropy are explained, values which are obtained according to the measuring methods described in Examples will be used. A first component means one compound, or two or more compounds. "A ratio of the first component" means the percentage by weight (% by weight) of the first component based on the total weight of the liquid crystal composition. The same rule applies to the ratio of a second component and so forth. A ratio of an additive mixed into the composition means the percentage by weight (% by weight) or weight parts per million (ppm) based on the total weight of the liquid crystal composition.

The symbol $R^1$ is used for a plurality of compounds in the chemical formulas of component compounds. The meanings of $R^1$ may be identical or different in two arbitrary compounds among these. In one case, for example, $R^1$ of the compound (1) is ethyl and $R^1$ of the compound (1-1) is ethyl. In another case, $R^1$ of the compound (1) is ethyl and $R^1$ of the compound (1-1) is propyl. The same rule applies to the symbols $R^2$, $X^3$ and so forth.

One of the advantages of the invention is to provide a liquid crystal composition that satisfies at least one of characteristics such as a high maximum temperature of a nematic phase, a low minimum temperature of a nematic phase, a small viscosity, a suitable optical anisotropy, a negatively large dielectric anisotropy, a large specific resistance, a high stability to ultraviolet light and a high stability to heat. Another advantage of the invention is to provide a liquid crystal composition that is suitably balanced regarding at least two of the characteristics. A further advantage of the invention is to provide a liquid crystal display device that contains the liquid crystal composition. An additional advantage of the invention is to provide a liquid crystal composition that has a suitable optical anisotropy, namely, a small optical anisotropy or a large optical anisotropy, a negatively large dielectric anisotropy, a high stability to ultraviolet light and so forth, and is to provide an AM device that has a short response time, a large voltage holding ratio, a large contrast ratio, a long service life and so forth.

The liquid crystal composition of the invention satisfied at least one of characteristics such as a high maximum temperature of a nematic phase, a low minimum temperature of a nematic phase, a small viscosity, a suitable optical anisotropy, a negatively large dielectric anisotropy, a large specific resistance, a high stability to ultraviolet light and a high stability to heat. The liquid crystal composition was suitably balanced regarding at least two of the characteristics. The liquid crystal display device contained the liquid crystal composition. The liquid crystal composition had a suitable optical anisotropy, a negatively large dielectric anisotropy, a high stability to ultraviolet light and so forth, and the AM device had a short response time, a large voltage holding ratio, a large contrast ratio, a long service life and so forth.

The invention includes the following items.

Item 1. A liquid crystal composition that has negative dielectric anisotropy, including two components, wherein a first component is at least one compound selected from the group of compounds represented by formula (1), and a second component is at least one compound selected from the group of compounds represented by formula (2):

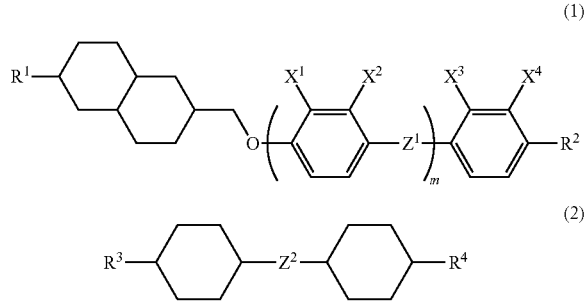

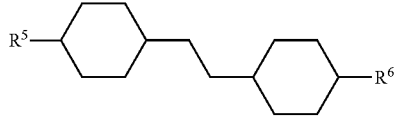

wherein $R^1$, $R^2$, $R^3$ and $R^4$ are each independently alkyl having 1 to 12 carbons, alkoxy having 1 to 12 carbons, alkenyl having 2 to 12 carbons, alkenyloxy having 2 to 11 carbons, or alkenyl having 2 to 12 carbons in which arbitrary hydrogen is replaced by fluorine; $X^1$ and $X^2$ are each independently hydrogen, fluorine or chlorine; $X^3$ and $X^4$ are each independently fluorine or chlorine; $Z^1$ and $Z^2$ are each independently a single bond, ethylene, methyleneoxy, oxymethylene, carbonyloxy or oxycarbonyl; and m is 0 or 1.

Item 2. The liquid crystal composition according to item 1, wherein the first component is at least one compound selected from the group of compounds represented by formula (1-1) and formula (1-2):

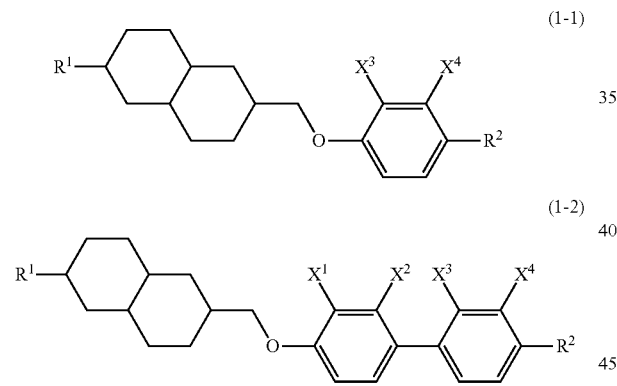

wherein $R^1$ and $R^2$ are each independently alkyl having 1 to 12 carbons, alkoxy having 1 to 12 carbons, alkenyl having 2 to 12 carbons, alkenyloxy having 2 to 11 carbons, or alkenyl having 2 to 12 carbons in which arbitrary hydrogen is replaced by fluorine; $X^1$ and $X^2$ are each independently hydrogen, fluorine or chlorine; and $X^3$ and $X^4$ are each independently fluorine or chlorine.

Item 3. The liquid crystal composition according to item 1 or 2, wherein the second component is at least one compound selected from the group of compounds represented by formula (2-1) and formula (2-2):

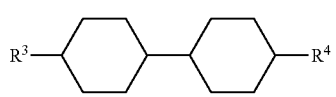

wherein $R^3$, $R^4$, $R^5$ and $R^6$ are each independently alkyl having 1 to 12 carbons, alkoxy having 1 to 12 carbons, alkenyl having 2 to 12 carbons, alkenyloxy having 2 to 11 carbons, or alkenyl having 2 to 12 carbons in which arbitrary hydrogen is replaced by fluorine.

Item 4. The liquid crystal composition according to item 3, wherein the second component is at least one compound selected from the group of compounds represented by formula (2-1).

Item 5. The liquid crystal composition according to any one of items 1 to 4, wherein the ratio of the first component is in the range of approximately 5% to approximately 70% by weight and the ratio of the second component is in the range of approximately 25% to approximately 90% by weight, based on the total weight of the liquid crystal composition.

Item 6. The liquid crystal composition according to any one of items 1 to 5, further including at least one compound selected from the group of compounds represented by formula (3-1) and formula (3-2) as a third component:

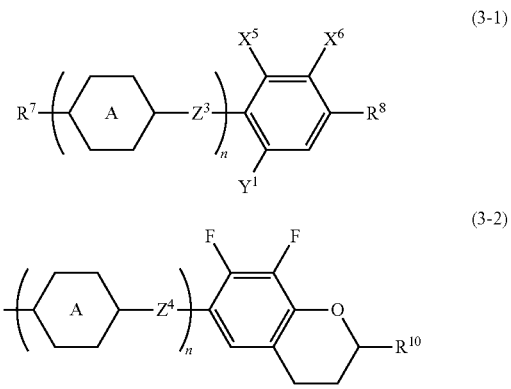

wherein $R^7$, $R^8$, $R^9$ and $R^{10}$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $X^6$ and $X^6$ are each independently fluorine or chlorine; $Y^1$ is hydrogen or methyl; the ring A is independently 1,4-cyclohexylene in which arbitrary —$CH_2$— may be nonadjacently replaced by —O— or —S—, or 1,4-phenylene in which arbitrary hydrogen may be replaced by fluorine or chlorine; $Z^3$ and $Z^4$ are each independently a single bond, ethylene, methyleneoxy or carbonyloxy; and n is 1, 2 or 3.

Item 7. The liquid crystal composition according to item 6, wherein the third component is at least one compound selected from the group of compounds represented by formula (3-1-1) to formula (3-1-14) and formula (3-2-1) to formula (3-2-5):

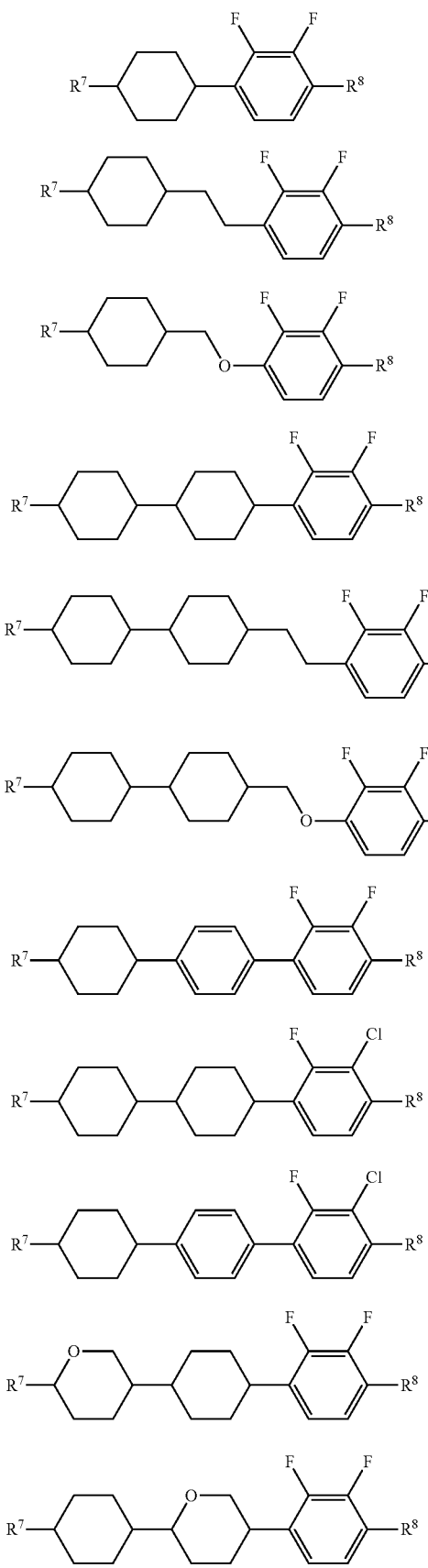
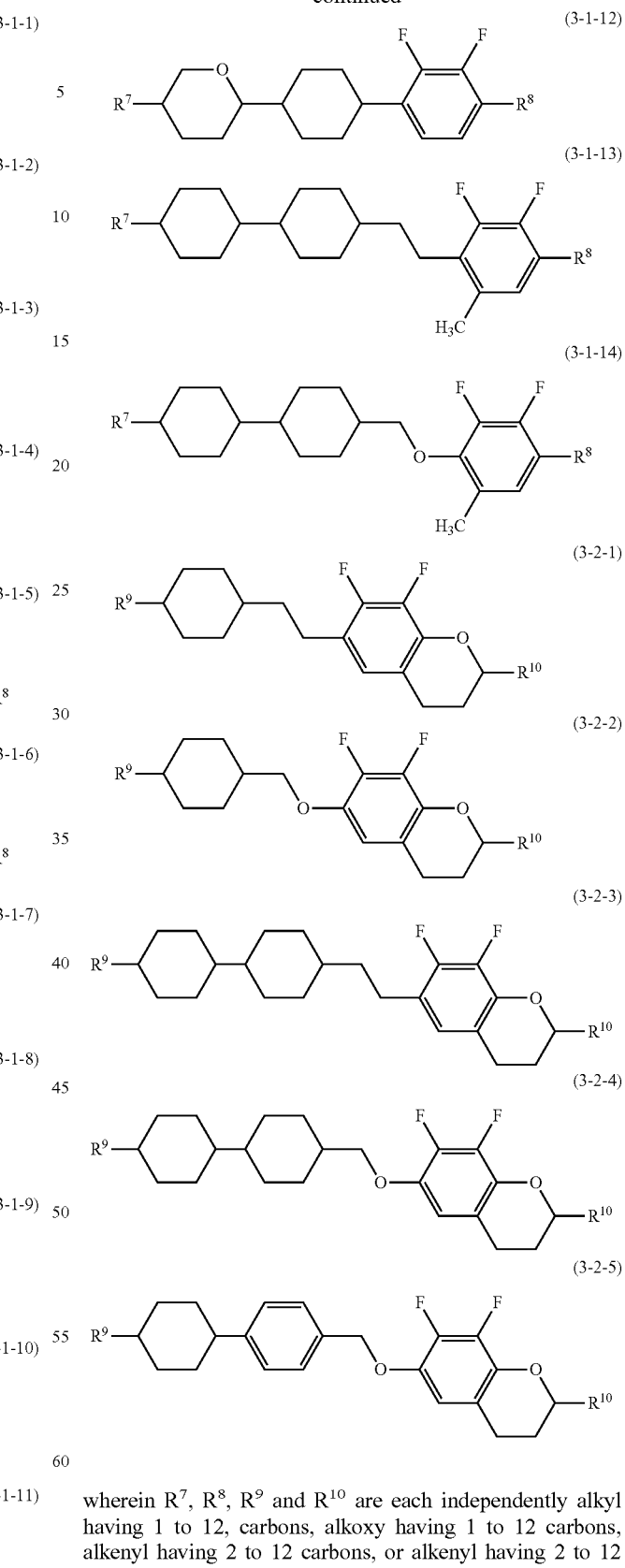
wherein $R^7$, $R^8$, $R^9$ and $R^{10}$ are each independently alkyl having 1 to 12, carbons, alkoxy having 1 to 12 carbons, alkenyl having 2 to 12 carbons, or alkenyl having 2 to 12 carbons in which arbitrary hydrogen is replaced by fluorine.
Item 8. The liquid crystal composition according to item 6 or 7, wherein the ratio of the third component is in the range of approximately 5% to approximately 65% by weight based on the total weight of the liquid crystal composition.

Item 9. The liquid crystal composition according to any one of items 1 to 8, further including at least one compound selected from the group of compounds represented by formula (4) as a fourth component:

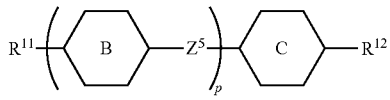
(4)

wherein $R^{11}$ and $R^{12}$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring B and the ring C are each independently 1,4-cyclohexylene, 1,4-phenylene, 2-fluoro-1,4-phenylene or 3-fluoro-1,4-phenylene; the ring C is 1,4-phenylene when p is 1; $Z^5$ is independently a single bond, ethylene, methyleneoxy or carbonyloxy; and p is 1, 2 or 3.

Item 10. The liquid crystal composition according to item 9, wherein the fourth component is at least one compound selected from the group of compounds represented by formula (4-1) to formula (4-11):

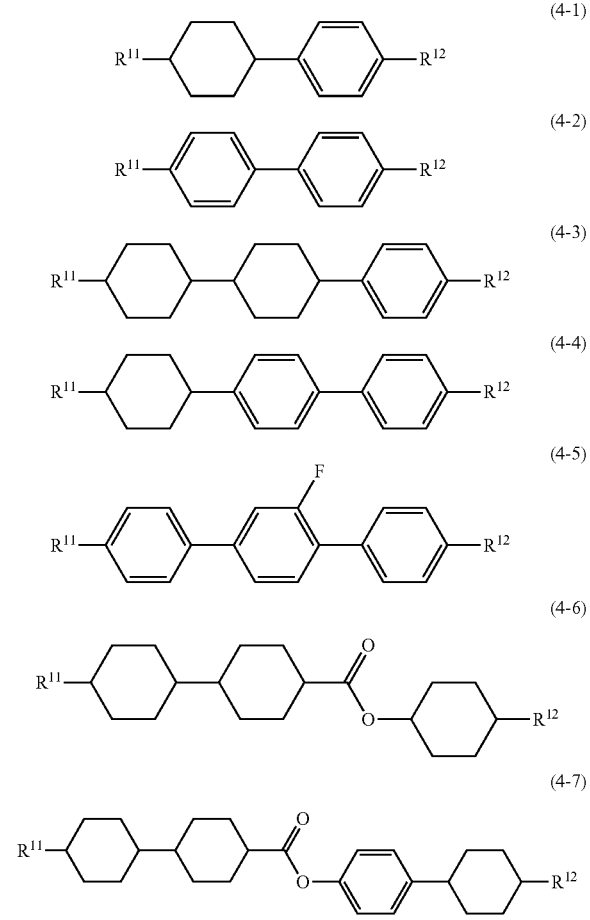

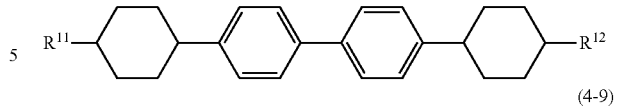
(4-8)

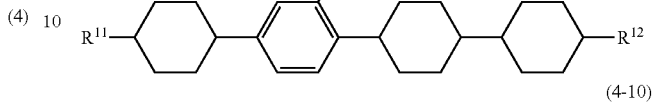
(4-9)

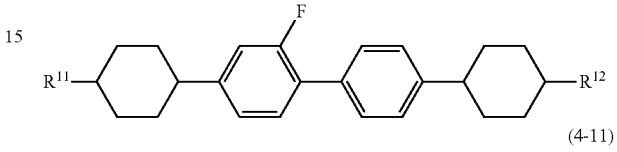
(4-10)

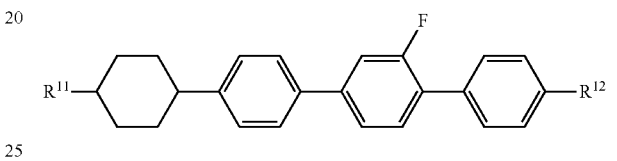
(4-11)

wherein $R^{11}$ and $R^{12}$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 11. The liquid crystal composition according to item 10, wherein the fourth component is at least one compound selected from the group of compounds represented by formula (4-3), formula (4-5) and formula (4-11).

Item 12. The liquid crystal composition according to any one of items 9 to 11, wherein the ratio of the fourth component is in the range of approximately 5% to approximately 60% by weight based on the total weight of the liquid crystal composition.

Item 13. The liquid crystal composition according to any one of items 1 to 12, wherein the maximum temperature of a nematic phase is approximately 70° C. or higher, the optical anisotropy (25° C.) at a wavelength of 589 nanometers is approximately 0.08 or more, and the dielectric anisotropy (25° C.) at a frequency of 1 kHz is approximately −2 or less.

Item 14. A liquid crystal display device containing the liquid crystal composition according to any one of items 1 to 13.

Item 15. The liquid crystal display device according to item 14, wherein an operating mode of the liquid crystal display device is a VA mode, an IPS mode or a PSA mode, and a driving mode of the liquid crystal display device is an active matrix mode.

The invention further includes the following items: (1) the composition described above that further includes an optically active compound; (2) the composition described above that further includes an additive, such as an antioxidant, an ultraviolet light absorbent and/or an antifoaming agent; (3) an AM device that includes the composition described above; (4) a device having a mode of TN, ECB, OCB, IPS, VA or PSA and containing the composition described above; (5) a device having a transmission type and including the composition described above; (6) use of the composition described above as a composition having a nematic phase; and (7) use of the composition described above as an optically active composition by adding an optically active compound to the composition.

The composition of the invention will be explained in the following order. First, the constitution of component compounds in the composition will be explained. Second, main characteristics of the component compounds and main effects of the compounds on the composition will be explained. Third, a combination of components in the composition, desirable ratios of the component compounds and the basis thereof will be explained. Fourth, a desirable embodiment of the component compounds will be explained. Fifth, examples of the component compounds will be shown. Sixth, additives that may be mixed into the composition will be explained. Seventh, methods for synthesizing the component compounds will be explained. Last, use of the composition will be explained.

First, the constitution of component compounds in the composition will be explained. The compositions of the invention are classified into the composition A and the composition B. The composition A may include other liquid crystal compound, an additive and an impurity. "Other liquid crystal compound" is different from the compound (1), the compound (2), the compound (3-1), the compound (3-2) and the compound (4). Such a compound is mixed into the composition for the purpose of further adjusting characteristics of the composition. Of other liquid crystal compounds, a smaller amount of a cyano compound is more desirable in view of its stability to heat or ultraviolet light. A more desirable ratio of the cyano compound is approximately 0% by weight. The additive includes an optically active compound, an antioxidant, an ultraviolet light absorbent, a coloring matter, an antifoaming agent, a polymerizable compound and a polymerization initiator. The impurity is a compound and so forth which contaminated component compounds in a process such as their synthesis. Even in the case where the compound is liquid crystalline, it is classified into an impurity herein.

The composition B is essentially consisting of compounds selected from the group of the compound (1), the compound (2), the compound (3-1), the compound (3-2) and the compound (4). The term "essentially" means that the composition may include an additive and an impurity, but does not include any liquid crystal compound other than these compounds. The composition B has a smaller number of components than the composition A. The composition B is preferable to the composition A in view of cost reduction. The composition A is preferable to the composition B in view of the fact that physical properties can be further adjusted by adding other liquid crystal compound.

Second, main characteristics of the component compounds and main effects of the compounds on the composition will be explained. The main characteristics of the component compounds are summarized in Table 2 on the basis of the effects of the invention. In Table 2, the symbol L stands for "large" or "high", the symbol M stands for "medium", and the symbol S stands for "small" or "low." The symbols L, M and S are classified on the basis of a qualitative comparison among the component compounds, and 0 (zero) means that "a value is nearly zero."

TABLE 2

Characteristics of Compounds

| | Compounds | | | |
|---|---|---|---|---|
| | Compound (1) | Compound (2) | Compound (3-1) Compound (3-2) | Compound (4) |
| Maximum temperature | M-L | S-M | M-L | S-L |
| Viscosity | M-L | S | M-L | S-M |
| Optical Anisotropy | M-L | S | M-L | S-L |
| Dielectric Anisotropy | M-L[1] | 0 | M-L[1] | 0 |
| Specific Resistance | L | L | L | L |

[1]The values of dielectric anisotropy are negative and the symbols show relative magnitude of absolute values.

Main effects of the component compounds on the characteristics of the composition upon mixing the component compounds to the composition are as follows. The compound (1) increases an absolute value of the dielectric anisotropy and decreases the minimum temperature. The compound (2) decreases the viscosity and decreases the optical anisotropy. The compound (3-1) and the compound (3-2) increase an absolute value of the dielectric anisotropy and decrease the minimum temperature. The compound (4) decreases the viscosity, adjusts to a suitable optical anisotropy, increases the maximum temperature and decreases the minimum temperature.

Third, a combination of the components in the composition, desirable ratios of the component compounds and the basis thereof will be explained. The combinations of the components in the composition is the first and second components, the first, second and third components, the first, second and fourth components, and the first, second, third and fourth components.

A desirable combination of the components in the composition is the first and second components for decreasing the viscosity, the first, second and fourth components for decreasing the viscosity or increasing the maximum temperature, and the first, second, third and fourth components for further increasing an absolute value of the dielectric anisotropy or increasing the maximum temperature.

A desirable ratio of the first component is approximately 5% by weight or more for increasing an absolute value of the dielectric anisotropy, and is approximately 70% by weight or less for decreasing the minimum temperature. A more desirable ratio is in the range of approximately 5% to approximately 60% by weight. An especially desirable ratio is in the range of approximately 5% to approximately 50% by weight.

A desirable ratio of the second component is approximately 25% by weight or more for increasing an absolute value of the dielectric anisotropy, and is approximately 90% by weight or less for increasing the maximum temperature. A more desirable ratio is in the range of approximately 35% to approximately 70% by weight for decreasing the viscosity.

A desirable ratio of the third component is approximately 5% by weight or more for increasing an absolute value of the dielectric anisotropy, and is approximately 65% by weight or less for decreasing the minimum temperature. A more desirable ratio is in the range of approximately 20% to approximately 40% by weight. An especially desirable ratio is in the range of approximately 25% to approximately 40% by weight.

A desirable ratio of the fourth component is approximately 5% by weight or more for decreasing the viscosity, and is approximately 60% by weight or less for decreasing the minimum temperature. A more desirable ratio is in the range of approximately 10% to approximately 50% by weight. An especially desirable ratio is in the range of approximately 20% to approximately 50% by weight.

Fourth, a desirable embodiment of the component compounds will be explained. $R^1$, $R^2$, $R^3$, $R^4$, $R^5$, $R^6$, $R^7$, $R^8$, $R^9$, $R^{10}$, $R^{11}$ and $R^{12}$ are each independently alkyl having 1 to 12 carbons, alkoxy having 1 to 12 carbons, alkenyl having 2 to 12 carbons, alkenyloxy having 2 to 11 carbons or alkenyl having 2 to 12 carbons in which arbitrary hydrogen is replaced by fluorine.

Desirable $R^1$, $R^2$, $R^3$, $R^4$, $R^5$, $R^6$, $R^7$, $R^8$, $R^9$, $R^{10}$, $R^{11}$ or $R^{12}$ is alkyl having 1 to 12 carbons or alkenyl having 2 to 12 carbons for decreasing the minimum temperature and decreasing the viscosity, or alkoxy having 1 to 12 carbons for increasing an absolute value of the dielectric anisotropy.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. A desirable configuration of —CH═CH— in the alkenyl depends on the position of a double bond. Trans is preferable in the alkenyl such as 1-propenyl, 1-butenyl, 1-pentenyl, 1-hexenyl, 3-pentenyl and 3-hexenyl for decreasing the viscosity and for something. Cis preferable in the alkenyl such as 2-butenyl, 2-pentenyl and 2-hexenyl. In the alkenyl, straight-chain alkenyl is preferable to branched-chain alkenyl.

Desirable alkenyloxy is vinyloxy, allyloxy, 3-butenyloxy, 3-pentenyloxy or 4-pentenyloxy. More desirable alkenyloxy is allyloxy or 3-butenyloxy for decreasing the viscosity.

Desirable examples of alkenyl in which arbitrary hydrogen is replaced by fluorine are 2,2-difluorovinyl, 3,3-difluoro-2-propenyl, 4,4-difluoro-3-butenyl, 5,5-difluoro-4-pentenyl and 6,6-difluoro-5-hexenyl. More desirable examples are 2,2-difluoro-vinyl and 4,4-difluoro-3-butenyl for decreasing the viscosity.

The ring A is 1,4-cyclohexylene in which arbitrary —CH$_2$— may be nonadjacently replaced by —O— or —S—, or 1,4-phenylene in which hydrogen may be replaced by fluorine or chlorine, and two arbitrary rings may be identical or different when n is 2 or 3. Desirable ring A is 1,4-cyclohexylene for increasing the maximum temperature or 1,4-phenylene for increasing the optical anisotropy. The ring B and the ring C are each independently 1,4-cyclohexylene, 1,4-phenylene, 2-fluoro-1,4-phenylene or 3-fluoro-1,4-phenylene, the ring C is 1,4-phenylene when p is 1, and two arbitrary rings B may be identical or different when p is 2 or 3. Desirable ring B or ring C is 1,4-cyclohexylene for increasing the maximum temperature or for decreasing the viscosity, or 1,4-phenylene for increasing the optical anisotropy.

$X^1$ and $X^2$ are each independently hydrogen, fluorine or chlorine. $X^3$ and $X^4$ are each independently fluorine or chlorine. $X^5$ and $X^6$ are each independently fluorine or chlorine. Desirable, $X^1$, $X^2$, $X^3$, $X^4$, $X^5$ or $X^6$ is fluorine for decreasing the viscosity.

$Y^1$ is methyl or hydrogen. Desirable $Y^1$ is methyl for increasing the stability to ultraviolet light or heat, and so forth, or hydrogen for decreasing the viscosity.

$Z^1$ and $Z^2$ are each independently a single bond, ethylene, methyleneoxy, oxymethylene, carbonyloxy or oxycarbonyl. Desirable $Z^1$ or $Z^2$ is a single bond for decreasing the viscosity, ethylene for decreasing the minimum temperature and methyleneoxy or carbonyloxy for increasing an absolute value of the dielectric anisotropy. $Z^3$ and $Z^4$ are each independently a single bond, ethylene, methyleneoxy or carbonyloxy. Desirable $Z^3$ or $Z^4$ is a single bond for decreasing the viscosity, or methyleneoxy or carbonyloxy for increasing an absolute value of the dielectric anisotropy. $Z^5$ is a single bond, ethylene, methyleneoxy or carbonyloxy. Two arbitrary $Z^5$ may be identical or different. Desirable $Z^6$ is a single bond for decreasing the viscosity, or methyleneoxy or carbonyloxy for increasing an absolute value of the dielectric anisotropy.

m is 0 or 1. n is 1, 2 or 3. p is 1, 2 or 3. Desirable m is 1 for increasing the maximum temperature or 0 for decreasing the viscosity. Desirable n or p is 2 or 3 for increasing the maximum temperature or 1 for decreasing the viscosity.

Fifth, examples of the component compounds will be shown. In the desirable compounds described below, $R^{13}$ and $R^{14}$ are each independently straight-chain alkyl having 1 to 12 carbons, alkoxy having 1 to 12 carbons and straight-chain alkenyl having 2 to 12 carbons. With regard to the configuration of 1,4-cyclohexylene in these compounds, trans is preferable to cis for increasing the maximum temperature.

Desirable compound (1) are the compounds (1-1-1) to (1-2-1). Especially desirable compound (1) is the compound (1-1-1). Desirable compound (2) are the compounds (2-1-1) to (2-2-1). Especially desirable compound (2) is the compound (2-1-1). Desirable compound (3-1) are the compounds (3-1-1-1) to (3-1-14-1). More desirable compound (3-1) are the compounds (3-1-1-1) to (3-1-3-1) and the compounds (3-1-5-1) to (3-1-14-1). Especially desirable compound (3-1) are the compounds (3-1-1-1), (3-1-3-1), (3-1-5-1), (3-1-11-1) and (3-2-2-1). Desirable compound (3-2) are the compounds (3-2-1-1) to (3-2-5-1). More desirable compound (3-2) are the compounds (3-2-1-1) to (3-2-4-1). Especially desirable compound (3-2) is the compound (3-2-4-1). Desirable compound (4) are the compounds (4-1-1) to (4-11-1). More desirable compound (4) are the compounds (4-1-1) to (4-7-1). Especially desirable compound (4) are the compounds (4-1-1), (4-2-1), (4-3-1), (4-7-1) and (4-11-1).

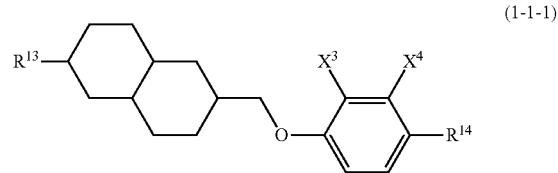

(1-1-1)

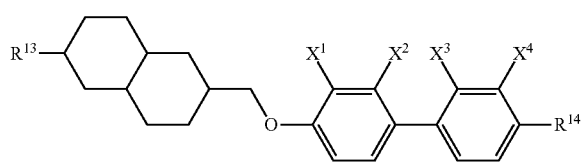

(1-2-1)

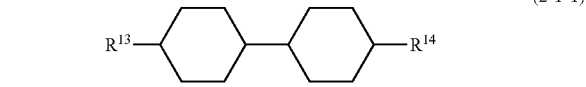

(2-1-1)

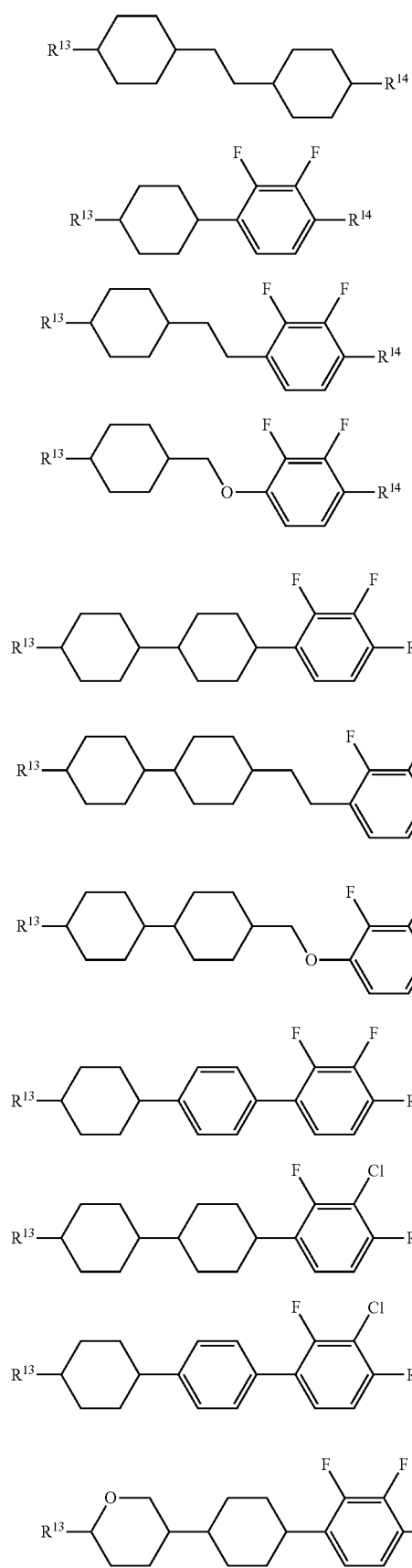
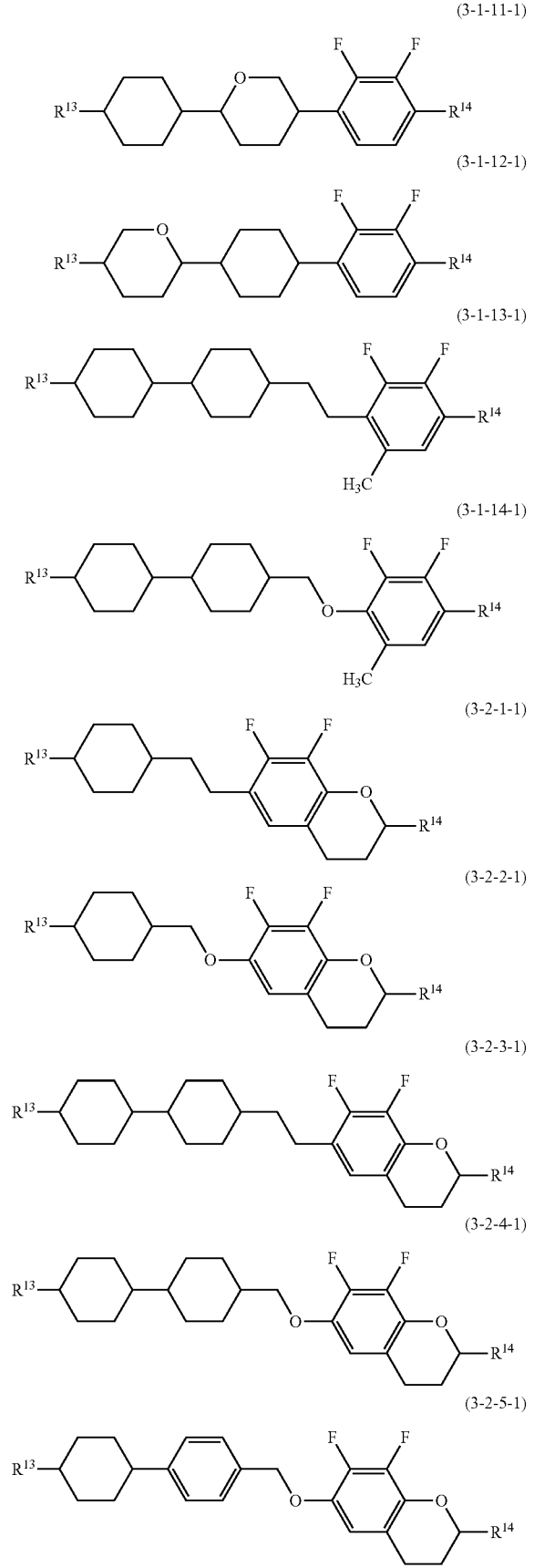

-continued

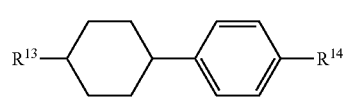
(4-1-1)

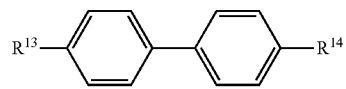
(4-2-1)

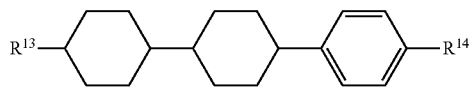
(4-3-1)

(4-4-1)

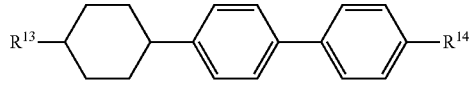
(4-5-1)

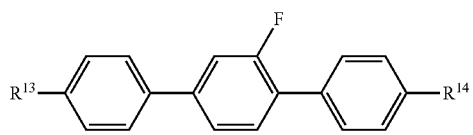
(4-6-1)

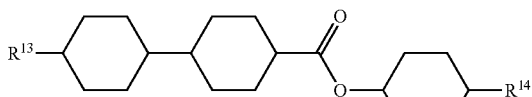
(4-7-1)

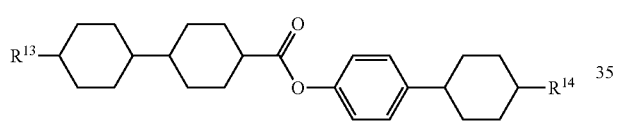
(4-8-1)

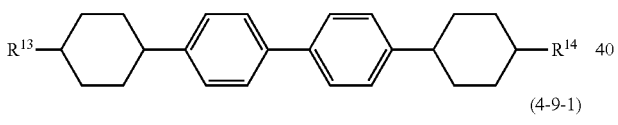
(4-9-1)

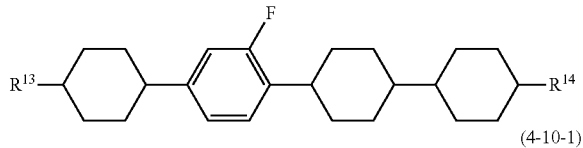
(4-10-1)

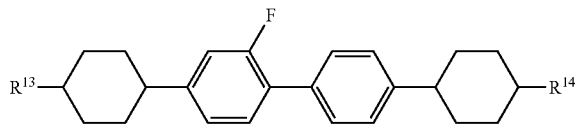
(4-11-1)

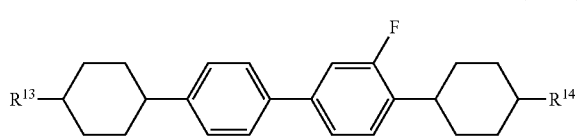

Sixth, additives which may be mixed into the composition will be explained. The additives include an optically active compound, an antioxidant, an ultraviolet light absorbent, a coloring matter, an antifoaming agent, a polymerizable compound and a polymerization initiator. The optically active compound is mixed into the composition for the purpose of inducing a helical structure and giving a twist angle in liquid crystals. Examples of the optically active compound include the compound (5-1) to the compound (5-4) described below. A desirable ratio of the optically active compound is approximately 5% by weight or less, and a more desirable ratio is in the range of approximately 0.01% to approximately 2% by weight.

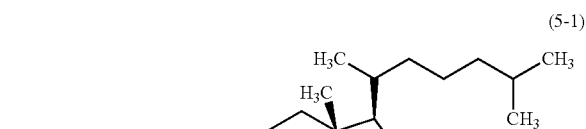
(5-1)

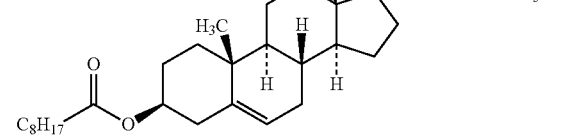
(5-2)

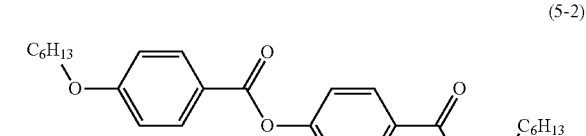
(5-3)

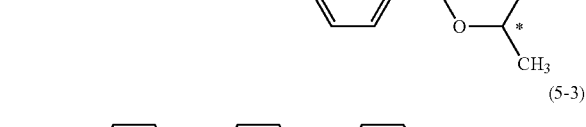
(5-4)

An antioxidant is mixed into the composition in order to prevent a decrease in specific resistance caused by heating under air, or to maintain a large voltage holding ratio at room temperature and also at a temperature close to the maximum temperature of a nematic phase even after the device has been used for a long time.

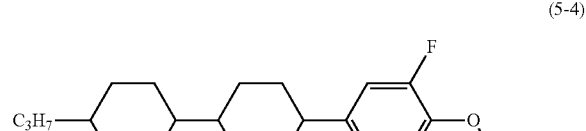
(6)

Desirable examples of the antioxidant include the compound (6) where w is an integer of from 1 to 9. In the compound (6), desirable w is 1, 3, 5, 7 or 9. More desirable w is 1 or 7. The compound (6) where w is 1 is effective in preventing a decrease of specific resistance caused by heating under air because it has a large volatility. The compound (6) where w is 7 is effective in maintaining a large voltage holding ratio at room temperature and also at a temperature close to the maximum temperature of a nematic phase even after the device has been used for a long time, because it has a small volatility. A desirable ratio of the antioxidant is approximately 50 ppm or more for achieving its effect and is approximately 600 ppm or less for avoiding a decrease of the maximum temperature or avoiding an increase of the minimum temperature. A more desirable ratio is in the range of approximately 100 ppm to approximately 300 ppm.

Desirable examples of the ultraviolet light absorbent include a benzophenone derivative, a benzoate derivative and a triazole derivative. A light stabilizer such as an amine having steric hindrance is also desirable. A desirable ratio of the ultraviolet light absorbent and the light stabilizer is approximately 50 ppm or more for achieving its effect and is approximately 10,000 ppm or less for avoiding a decrease of the maximum temperature or avoiding an increase of the minimum temperature. A more desirable ratio is in the range of approximately 100 ppm to approximately 10,000 ppm.

A dichroic dye such as an azo dye or an anthraquinone dye is mixed into the composition for adjusting to a device having a guest host (GH) mode. A desirable ratio of the coloring matter is in the range of approximately 0.01% to approximately 10% by weight. An antifoaming agent such as dimethyl silicone oil or methyl phenyl silicone oil is mixed into the composition for preventing foam formation. A desirable ratio of the antifoaming agent is approximately 1 ppm or more for achieving its effect and is approximately 1,000 ppm or less for avoiding a poor display. A more desirable ratio is in the range of approximately 1 ppm to approximately 500 ppm.

A polymerizable compound is mixed into the composition for adjusting to a device having a PSA (polymer sustained alignment) mode. Desirable examples of the polymerizable compound include compounds having a polymerizable group, such as acrylates, methacrylates, vinyl compounds, vinyloxy compounds, propenyl ethers, epoxy compounds (oxiranes, oxetanes) and vinyl ketones. Especially desirable examples of the polymerizable compound are acrylate derivatives or methacrylate derivatives. A desirable ratio of the polymerizable compound is approximately 0.05% by weight or more for achieving its effect and is approximately 10% by weight or less for avoiding a poor display. A more desirable ratio is in the range of approximately 0.1% to approximately 2% by weight. The polymerizable compound is preferably polymerized on irradiation with ultraviolet light or the like in the presence of a suitable initiator such as a photopolymerization initiator. Suitable conditions for polymerization, suitable types of the initiator and suitable amounts thereof are known to a person skilled in the art and are described in the literature. For example, Irgacure 651 (registered trademark), Irgacure 184 (registered trademark) or Darocure 1173 (registered trademark) (Ciba Japan K.K.), which is a photopolymerization initiator, is suitable for radical polymerization. The ratio of the photopolymerization initiator is preferably in the range of approximately 0.1% to approximately 5% by weight, and most preferably in the range of approximately 1% to approximately 3% by weight based on the weight of the polymerizable compound.

Seventh, methods for synthesizing the component compounds will be explained. These compounds can be synthesized by known methods. The synthetic methods will be exemplified as follows. The compound (1-1-1) is synthesized by the method described in W. Sucrow, H. Wolter, Chem. Ber., 118, 3350 (1985). The compound (2-1-1) is synthesized by the method described in JP 559-70624 A/1984. The compound (3-1-4) is synthesized by the method described in JP H2-503441 A/1990. The compound (4-1-1) is synthesized by the method described in JP 556-68636 A/1981. An antioxidant is commercially available. The compound of formula (6) where w is 1 is available from Sigma-Aldrich Corporation. The compound (6) where w is 7, and so forth are synthesized according to the method described in U.S. Pat. No. 3,660,505.

The compounds for which synthesizing methods were not described above can be synthesized according to the methods described in Organic Syntheses (John Wiley & Sons, Inc.), Organic Reactions (John Wiley & Sons, Inc.), Comprehensive Organic Synthesis (Pergamon Press), New experimental Chemistry Course (Shin Jikken Kagaku Kouza, in. Japanese title) (Maruzen Co., Ltd.) and so forth. The composition is prepared according to known methods using the compounds thus obtained. For example, the component compounds are mixed and dissolved each other by heating.

Last, use of the composition will be explained. Most of the compositions have a minimum temperature of approximately −10° C. or lower, a maximum temperature of approximately 70° C. or higher, and an optical anisotropy in the range of approximately 0.07 to approximately 0.20. The device containing the composition has a large voltage holding ratio. The composition is suitable for an AM device. The composition is suitable especially for an AM device having a transmission type. The composition having an optical anisotropy in the range of approximately 0.08 to approximately 0.25 may be prepared by regulating ratios of the component compounds or by mixing other liquid crystal compound. The composition can be used as a composition having a nematic phase and as an optically active composition by adding an optically active compound.

The composition can be used for an AM device. It can also be used for a PM device. The composition can also be used for the AM device and the PM device having a mode such as PC, TN, STN, ECB, OCB, IPS, VA or PSA. It is especially desirable to use the composition for the AM device having the IPS or VA mode. These devices may be of a reflection type, a transmission type or a semi-transmission type. It is desirable to use the composition for a device having the transmission type. It can be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three-dimensional network-polymer is formed in the composition.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

A composition and a compound were a subject for measurement in order to evaluate characteristics of the composition and the compound to be included in the composition. When the subject for measurement was a composition, the composition itself was measured as a sample, and the value obtained was described here. When the subject for measurement was a compound, a sample for measurement was prepared by mixing the compound (15% by weight) and mother liquid crystals (85% by weight). Characteristic values of the compound were calculated from values obtained by measurement, according to a method of extrapolation. That is: (extrapolated value)=[(measured value of a sample for measurement)−0.85×(measured value of mother liquid crystals)]/0.15. When a smectic phase (or crystals) separated out at this ratio at 25° C., the ratio of the compound and the mother liquid crystals was changed step by step in the order of (10% by weight/90% by weight), (5% by weight/95% by weight), (1% by weight/99% by weight). Values of the maximum temperature, the optical anisotropy, the viscosity and the dielectric anisotropy with regard to the compound were obtained by the extrapolation.

The components and their ratios of the mother liquid crystals were as follows.

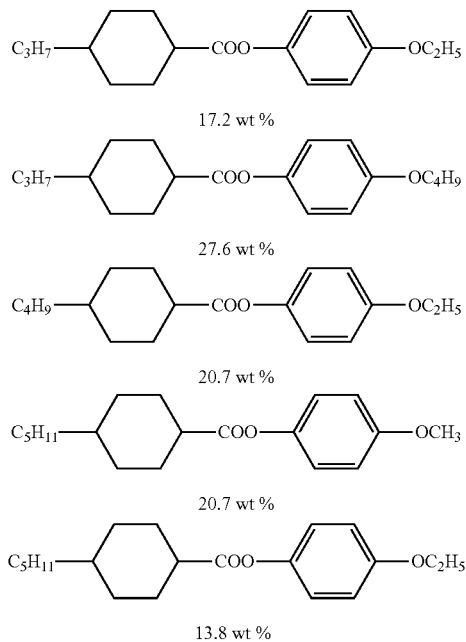

Characteristics were measured according to the following methods. Most methods are described in the Standards of Electronic Industries Association of Japan, EIAJ•ED-2521A or those with some modifications.

Maximum Temperature of a Nematic Phase (NI; ° C.): A sample was placed on a hot plate in a melting point apparatus equipped with a polarizing microscope and was heated at the rate of 1° C. per minute. Temperature was measured when part of the sample began to change from a nematic phase to an isotropic liquid. A higher limit of the temperature range of a nematic phase may occasionally be abbreviated to "the maximum temperature."

Minimum Temperature of a Nematic Phase (Tc; ° C.): A sample having a nematic phase was put in glass vials and then kept in freezers at temperatures of 0° C., −10° C., −20° C., −30° C. and −40° C. for 10 days, and then the liquid crystal phases were observed. For example, when the sample remained the nematic phase at −20° C. and changed to crystals or a smectic phase at −30° C., Tc was expressed as ≦−20° C. A lower limit of the temperature range of a nematic phase may occasionally be abbreviated to "the minimum temperature."

Viscosity (bulk viscosity; η; measured at 20° C.; mPa·s): Viscosity was measured by use of an E-type viscometer.

Optical Anisotropy (refractive index anisotropy; Δn; measured at 25° C.): Measurement was carried out by use of an Abbe refractometer with a polarizing plate mounted on the ocular, on irradiation with light at a wavelength of 589 nanometers. The surface of the main prism was rubbed in one direction, and then a sample was dropped on the main prism. A refractive index (n∥) was measured when the direction of polarized light was parallel to that of the rubbing. A refractive index (n⊥) was measured when the direction of polarized light was perpendicular to that of the rubbing. The value of optical anisotropy was calculated from the equation: Δn=n∥−n⊥.

Dielectric Anisotropy (Δ∈; measured at 25° C.): The value of dielectric anisotropy was calculated from the equation: Δ∈=∈∥−∈⊥. Dielectric constants (∈∥ and ∈⊥) were measured as follows.

1) Measurement of a dielectric constant (∈∥): A solution of octadecyltriethoxysilane (0.16 mL) in ethanol (20 mL) was applied to a thoroughly cleaned glass substrate. The glass substrate was rotated with a spinner, and then heated at 150° C. for one hour. A sample was poured into a VA device having the distance between two glass substrates (cell gap) of 4 micrometers, and then the device was sealed with an adhesive curable on irradiation with ultraviolet light. Sine waves (0.5 V, 1 kHz) were impressed onto the device, and a dielectric constant (∈∥) in a major axis direction of liquid crystal molecules was measured after 2 seconds.

2) Measurement of a dielectric constant (∈⊥): A polyimide solution was applied to a thoroughly cleaned glass substrate. The glass substrate was heated, and then the alignment film obtained was subjected to rubbing treatment. A sample was poured into a TN device having the distance between two glass substrates (cell gap) of 9 micrometers and the twist angle of 80 degrees. Sine waves (0.5 V, 1 kHz) were impressed onto the device, and a dielectric constant (∈⊥) in a minor axis direction of liquid crystal molecules was measured after 2 seconds.

Threshold Voltage (Vth; measured at 25° C.; V): Measurement was carried out with an LCD evaluation system Model LCD-5100 made by Otsuka Electronics Co., Ltd. The light source was a halogen lamp. A sample was poured into a VA device having a normally black mode, in which the distance between two glass substrates (cell gap) was 4 micrometers and a rubbing direction was antiparallel, and then the device was sealed with an ultraviolet light-curable adhesive. Voltage to be impressed onto the device (60 Hz, rectangular waves) was stepwise increased in 0.02 V increments from 0 V up to 20 V. During the increase, the device was irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The threshold voltage was voltage at 10% transmittance.

Voltage Holding Ratio (VHR-1; measured at 25° C.; %): A TN device used for measurement had a polyimide-alignment film, and the distance between two glass substrates (cell gap) was 5 micrometers. A sample was poured into the device, and then the device was sealed with an adhesive polymerizable on irradiation with ultraviolet light. The TN device was impressed and charged with pulse voltage (60 microseconds at 5 V). A decreasing voltage was measured for 16.7 milliseconds with a high-speed voltmeter, and the area A between a voltage curve and a horizontal axis in a unit cycle was obtained. The area B was an area without the decrease. The voltage holding ratio was a percentage of the area A to the area B.

Voltage Holding Ratio (VHR-2; measured at 80° C.; %): A TN device used for measurement had a polyimide-alignment film, and the distance between two glass substrates (cell gap) was 5 micrometer. A sample was poured into the device, and then the device was sealed with an adhesive polymerizable on irradiation with ultraviolet light. The TN device was impressed and charged with pulse voltage (60 microseconds at 5 V). A decreasing voltage was measured for 16.7 milliseconds with a high-speed voltmeter and the area A between a voltage curve and a horizontal axis in a unit cycle was obtained. The area B was an area without the decease. The voltage holding ratio was a percentage of the area A to the area B.

Voltage Holding Ratio (VHR-3; measured at 25° C.; %): A voltage holding ratio was measured after irradiation with ultraviolet light, evaluating the stability to ultraviolet light. A composition having a large VHR-3 has a high stability to ultraviolet light. A TN device used for measurement had a polyimide-alignment film and the cell gap was 5 micrometers. A sample was poured into the device, and then the device was irradiated with light for 20 minutes. The light source was an ultra high-pressure mercury lamp USH-500D (produced by Ushio, Inc.), and the distance between the device and the light source was 20 cm. In the measurement of VHR-3, a decreasing voltage was measured for 16.7 milliseconds. The value of VHR-3 is preferably 90% or more, and more preferably 95% or more.

Voltage Holding Ratio (VHR-4; measured at 25° C.; %): A TN device into which a sample was poured was heated in a constant-temperature bath at 80° C. for 500 hours, and then the voltage holding ratio was measured, evaluating the stability to heat. A composition having a large VHR-4 has a high stability to heat. In the measurement of VHR-4, a decreasing voltage was measured for 16.7 milliseconds.

Response Time (τ; measured at 25° C.; millisecond): Measurement was carried out with an LCD evaluation system Model LCD-5100 made by Otsuka Electronics Co., Ltd. The light source was a halogen lamp. The low-pass filter was set at 5 kHz. A sample was poured into a VA device having a normally black mode, in which the cell gap between two glass substrates was 4 micrometers, and a rubbing direction was antiparallel, and then the device was sealed with an ultraviolet light-curable adhesive. Rectangular waves (60 Hz, 10 V, 0.5 second) were impressed to the device. The device was simultaneously irradiated with light in the perpendicular direction, and the amount of light passing through the device was measured. The maximum amount of light corresponded to 100% transmittance, and the minimum amount of light corresponded to 0% transmittance. The response time was the period of time required for the change from 90% to 10% transmittance (fall time: millisecond).

Specific resistance (ρ; measured at 25° C.; Ωcm): A sample of 1.0 milliliters was poured into a vessel equipped with electrodes. DC voltage (10V) was impressed to the vessel, and the DC current was measured after 10 seconds. The specific resistance was calculated according to the following equation. (specific resistance)=[(voltage)×(electric capacity of vessel)]/[(DC current)×(dielectric constant in a vacuum)].

Gas chromatographic analysis: A gas chromatograph Model GC-14B made by Shimadzu Corporation was used for measurement. The carrier gas was helium (2 milliliters per minute). The evaporator and the detector (FID) were set up at 280° C. and 300° C., respectively. A capillary column DB-1 (length 30 meters, bore 0.32 millimeter, film thickness 0.25 micrometer, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was prepared in an acetone solution (0.1% by weight), and 1 microliter of the solution was injected into the evaporator. A recorder used was a Model C-R5A Chromatopac Integrator made by Shimadzu Corporation or its equivalent. A gas chromatogram obtained showed the retention time of peaks and the peak areas corresponding to the component compounds.

Solvents for diluting the sample may also be chloroform, hexane and so forth. The following capillary columns may also be used in order to separate the component compounds: HP-1 made by Agilent Technologies Inc. (length 30 meters, bore 0.32 millimeter, film thickness 0.25 micrometer), Rtx-1 made by Restek Corporation (length 30 meters, bore 0.32 millimeter, film thickness 0.25 micrometer), and BP-1 made by SGE International Pty. Ltd. (length 30 meters, bore 0.32 millimeter, film thickness 0.25 micrometer). A capillary column CBP1-M50-025 (50 meters, bore 0.25 millimeter, film thickness 0.25 micrometer) made by Shimadzu Corporation may also be used for the purpose of avoiding an overlap of peaks of the compounds.

The ratio of the liquid crystal compounds included in the composition may be calculated according to the following method. The liquid crystal compounds are detected by use of a gas chromatograph. The ratio of peak areas in the gas chromatogram corresponds to the ratio (in moles) of the liquid crystal compounds. When the capillary columns described above are used, the correction coefficient of respective liquid crystal compounds may be regarded as one. Accordingly, the ratio (percent by weight) of the liquid crystal compound can be calculated from the ratio of peak areas.

The invention will be explained in detail by way of Examples. The invention is not limited by Examples described below. The compounds described in Comparative Examples and Examples were expressed as symbols according to the definition in the following Table 3. In Table 3, the configuration of 1,4-cyclohexylene is trans. A parenthesized number next to the symbolized compound in Example corresponds to the compound's number. The symbol (–) means other liquid crystal compound. Ratios (percentage) of liquid crystal compounds mean the percentages by weight (% by weight) based on the total weight of the liquid crystal composition. The liquid crystal composition further includes an impurity. Last, characteristics of the composition are summarized.

TABLE 3

Method of Description of Compound using Symbols
R—(A$_1$)—Z$_1$—...—Z$_n$—(A$_n$)—R'

| 1) Left Terminal Group R— | Symbol |
|---|---|
| $C_nH_{2n+1}$— | n- |
| $C_nH_{2n+1}O$— | nO— |
| $C_mH_{2m+1}OC_nH_{2n}$— | mOn- |
| $CH_2$=CH— | V— |
| $C_nH_{2n+1}$—CH=CH— | nV— |
| $CH_2$=CH—$C_nH_{2n}$— | Vn- |
| $C_mH_{2m+1}$—CH=CH—$C_nH_{2n}$— | mVn- |
| $CF_2$=CH— | VFF— |
| $CF_2$=CH—$C_nH_{2n}$— | VFFn- |

| 2) Right Terminal Group —R' | Symbol |
|---|---|
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | -nV |
| —CH=$CF_2$ | —VFF |
| —COOCH$_3$ | -EMe |

TABLE 3-continued

Method of Description of Compound using Symbols
R—(A₁)—Z₁—...—Zₙ—(Aₙ)—R'

| 3) Bonding Group —$Z_n$— | Symbol |
|---|---|
| —$OC_nH_{2n}O$— | OnO |
| —$C_nH_{2n}$— | n |
| —COO— | E |
| —CH=CH— | V |
| —$CH_2O$— | 1O |
| —$OCH_2$— | O1 |
| —$SiH_2$— | Si |
| —$CF_2O$— | X |
| —$OCF_2$— | x |

| 4) Ring Structure —$A_n$— | Symbol |
|---|---|
|  | H |
| 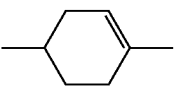 | ch |
|  | B |
| 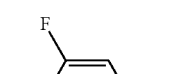 | B(2F) |
| 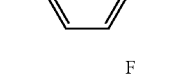 | B(3F) |
|  | B(2F,3F) |
| 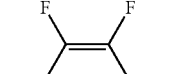 | B(2F,3CL) |
|  | B(2CL,3F) |
| 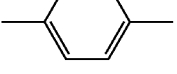 | dh |
| 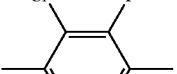 | Dh |
| 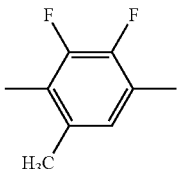 | B(2F,3F,6Me) |
| 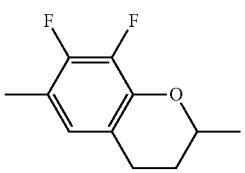 | Cro(7F,8F) |
| 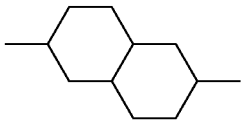 | Npd |

5) Example of Description

Example 1. 3-Npd1OB(2F,3F)—O2

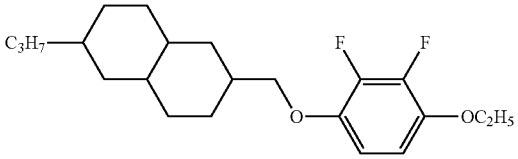

Example 2. 3-HHB(2F,3F)—O2

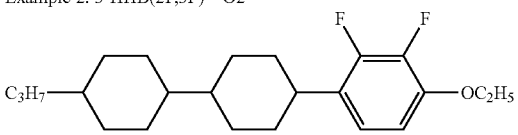

Example 3. 5-HBB(3F)B-3

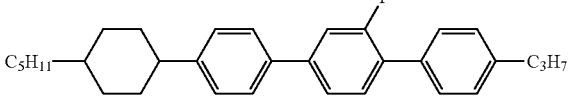

Example 4. 3-HBB(2F,3F)—O2

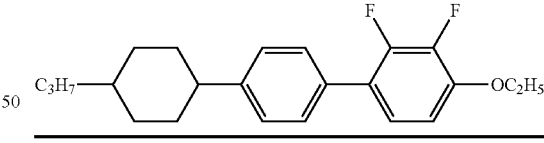

Comparative Example 1

Example 2 was selected from compositions disclosed in JP 2001-34197 A. The basis for the selection was that the composition included a compound similar to the compound (1-1-1) and had the largest negative dielectric anisotropy (Δ∈). The composition had the following components and characteristics.

| 1V-NpdH-3 | (—) | 20% |
| V-NpdH-3 | (—) | 20% |
| 3-NpdB(2F,3F)-O2 | similar to (1-1-1) | 20% |

| 5-NpdB(2F,3F)-O2 | similar to (1-1-1) | 20% |
| 3-HB(2F,3F)-O2 | (3-1-1-1) | 10% |
| 3-HHB(2F,3F)-O2 | (3-1-4-1) | 10% |

NI=80.0° C.; Δn=0.085; η=29.6 mPa·s; Δ∈=−2.9.

Example 1

| 3-Npd1OB(2F,3F)-O2 | (1-1-1) | 7% |
| 2-HH-3 | (2-1-1) | 29% |
| V-HB(2F,3F)-O2 | (3-1-1-1) | 15% |
| V-HB(2F,3F)-O4 | (3-1-1-1) | 2% |
| 2-HBB(2F,3F)-O2 | (3-1-7-1) | 3% |
| 3-HBB(2F,3F)-O2 | (3-1-7-1) | 10% |
| 5-HBB(2F,3F)-O2 | (3-1-7-1) | 10% |
| 3-HHB(2F,3CL)-O2 | (3-1-8-1) | 3% |
| 4-HHB(2F,3CL)-O2 | (3-1-8-1) | 3% |
| 5-HHB(2F,3CL)-O2 | (3-1-8-1) | 3% |
| 3-HHB-1 | (4-3-1) | 6% |
| 3-HHB-O1 | (4-3-1) | 3% |
| 3-HHB-3 | (4-3-1) | 6% |

NI=83.6° C.; Tc≦−20° C.; Δn=0.092; η=23.1 mPa·s; Δ∈=−3.1; VHR-1=99.2%; VHR-2=98.1%.

Example 2

| 3-Npd1OB(2F,3F)-O2 | (1-1-1) | 7% |
| 2-HH-3 | (2-1-1) | 32% |
| V-HB(2F,3F)-O2 | (3-1-1-1) | 15% |
| V-HB(2F,3F)-O4 | (3-1-1-1) | 2% |
| 2-HBB(2F,3F)-O2 | (3-1-7-1) | 3% |
| 3-HBB(2F,3F)-O2 | (3-1-7-1) | 10% |
| 5-HBB(2F,3F)-O2 | (3-1-7-1) | 10% |
| 3-HH1OCro(7F,8F)-5 | (3-2-4-1) | 5% |
| 3-HHB-1 | (4-3-1) | 6% |
| 3-HHB-O1 | (4-3-1) | 4% |
| 3-HHB-3 | (4-3-1) | 6% |

NI=80.3° C.; Δn=0.089; η=21.1 mPa·s; Δ∈=−3.1; VHR-1=99.3%; VHR-2=97.9%.

Example 3

| 3-Npd1OB(2F,3F)B(2F,3F)-O2 | (1-2-1) | 5% |
| 2-HH-3 | (2-1-1) | 29% |
| V-HB(2F,3F)-O2 | (3-1-1-1) | 15% |
| V-HB(2F,3F)-O4 | (3-1-1-1) | 4% |
| 3-HBB(2F,3F)-O2 | (3-1-7-1) | 10% |
| 5-HBB(2F,3F)-O2 | (3-1-7-1) | 8% |
| 2-HHB(2F,3CL)-O2 | (3-1-8-1) | 2% |
| 3-HHB(2F,3CL)-O2 | (3-1-8-1) | 3% |
| 4-HHB(2F,3CL)-O2 | (3-1-8-1) | 3% |
| 5-HHB(2F,3CL)-O2 | (3-1-8-1) | 3% |
| 3-HB-O2 | (4-1-1) | 5% |
| 3-HHB-1 | (4-3-1) | 5% |
| 3-HHB-O1 | (4-3-1) | 3% |
| 3-HHB-3 | (4-3-1) | 5% |

NI=80.6° C.; Δn=0.090; η=25.6 mPa·s; Δ∈=−3.1; VHR-1=99.3%; VHR-2=98.0%.

Example 4

| 3-Npd1OB(2F,3F)B(2F,3F)-O2 | (1-2-1) | 3% |
| 2-HH-3 | (2-1-1) | 29% |
| V-HB(2F,3F)-O2 | (3-1-1-1) | 15% |
| V-HB(2F,3F)-O4 | (3-1-1-1) | 7% |
| 2-HBB(2F,3F)-O2 | (3-1-7-1) | 8% |
| 3-HBB(2F,3F)-O2 | (3-1-7-1) | 10% |
| 5-HBB(2F,3F)-O2 | (3-1-7-1) | 9% |
| 3-HB-O2 | (4-1-1) | 5% |
| 3-HHB-1 | (4-3-1) | 4% |
| 3-HHB-O1 | (4-3-1) | 6% |
| 3-HHEBH-3 | (4-7-1) | 4% |

NI=80.4° C.; Δn=0.095; η=21.7 mPa·s; Δ∈=−3.1.

Example 5

| 3-Npd1OB(2F,3F)-O2 | (1-2-1) | 10% |
| 3-HH-V | (2-1-1) | 5% |
| 2-HH-5 | (2-1-1) | 5% |
| 3-HH-4 | (2-1-1) | 5% |
| 3-HH-5 | (2-1-1) | 5% |
| 3-HH-O1 | (2-1-1) | 5% |
| 3-HH-V1 | (2-1-1) | 4% |
| 3-HB(2F,3F)-O2 | (3-1-1-1) | 10% |
| 5-HB(2F,3F)-O2 | (3-1-1-1) | 10% |
| 3-H1OB(2F,3F)-O2 | (3-1-3-1) | 7% |
| 3-HHB(2F,3F)-O2 | (3-1-4-1) | 5% |
| 5-HHB(2F,3F)-O2 | (3-1-4-1) | 5% |
| V-HHB(2F,3F)-O2 | (3-1-4-1) | 3% |
| 3-HHB-1 | (4-3-1) | 5% |
| 3-HHB-O1 | (4-3-1) | 5% |
| 3-HHB-3 | (4-3-1) | 5% |
| 3-HHEBH-3 | (4-7-1) | 3% |
| 3-HHEBH-4 | (4-7-1) | 3% |

NI=83.3° C.; Tc≦−20° C.; Δn=0.079; η=22.4 mPa·s; Δ∈=−3.1.

Example 6

| 3-Npd1OB(2F,3F)-O2 | (1-1-1) | 10% |
| 3-HH-V | (2-1-1) | 30% |
| 3-HB(2F,3F)-O2 | (3-1-1-1) | 5% |
| V-HB(2F,3F)-O2 | (3-1-1-1) | 5% |
| 3-H1OB(2F,3F)-O2 | (3-1-3-1) | 5% |
| 5-H1OB(2F,3F)-O2 | (3-1-3-1) | 5% |
| 3-HHB(2F,3F)-O2 | (3-1-4-1) | 5% |
| 5-HHB(2F,3F)-O2 | (3-1-4-1) | 5% |
| 3-HH1OB(2F,3F)-O2 | (3-1-6-1) | 3% |
| 3-HBB(2F,3F)-O2 | (3-1-7-1) | 10% |
| 4-HBB(2F,3F)-O2 | (3-1-7-1) | 5% |
| 2-BB(3F)B-5 | (4-5-1) | 3% |
| 1-BB(3F)B-2V | (4-5-1) | 3% |
| 5-HBB(3F)B-2 | (4-11-1) | 3% |
| 5-HBB(3F)B-3 | (4-11-1) | 3% |

NI=82.9° C.; Tc≦−20° C.; Δn=0.108; η=25.0 mPa·s; Δ∈=−3.5.

Example 7

| | | |
|---|---|---|
| 3-Npd1OB(2F,3F)B(2F,3F)-O2 | (1-1-1) | 5% |
| 3-HH-4 | (2-1-1) | 10% |
| 3-HH-5 | (2-1-1) | 10% |
| 5-HH-V | (2-1-1) | 13% |
| 3-HB(2F,3F)-O2 | (3-1-1-1) | 15% |
| 4-HBB(2F,3F)-O2 | (3-1-7-1) | 6% |
| 3-HDhB(2F,3F)-O2 | (3-1-11-1) | 8% |
| 5-HDhB(2F,3F)-O2 | (3-1-11-1) | 8% |
| 3-HH1OB(2F,3F,6Me)-O2 | (3-1-14-1) | 5% |
| 5-HB-O2 | (4-1-1) | 4% |
| 3-HBB-2 | (4-4-1) | 4% |
| 2-BB(3F)B-3 | (4-5-1) | 5% |
| 2-BB(3F)B-5 | (4-5-1) | 5% |
| 3-HHEH-3 | (4-6-1) | 2% |

NI=84.4° C.; Δn=0.104; η=28.3 mPa·s; Δ∈=−3.0.

Example 8

| | | |
|---|---|---|
| 3-Npd1OB(2F,3F)-O2 | (1-1-1) | 10% |
| 3-Npd1OB(2F,3F)B(2F,3F)-O2 | (1-2-1) | 5% |
| 3-HH-V | (2-1-1) | 16% |
| 3-HB(2F,3F)-O2 | (3-1-1-1) | 8% |
| V-HB(2F,3F)-O2 | (3-1-1-1) | 10% |
| V-HB(2F,3F)-O3 | (3-1-1-1) | 10% |
| 3-H2B(2F,3F)-O2 | (3-1-2-1) | 5% |
| 5-H2B(2F,3F)-O2 | (3-1-2-1) | 5% |
| 3-HHB-1 | (4-3-1) | 3% |
| 3-HHB-O1 | (4-3-1) | 3% |
| 3-HHB-3 | (4-3-1) | 3% |
| 1-BB(3F)B-2V | (4-5-1) | 5% |
| 3-HHEBH-3 | (4-7-1) | 3% |
| 3-HHEBH-4 | (4-7-1) | 3% |
| 3-HHEBH-5 | (4-7-1) | 3% |
| 3-HBBH-3 | (4-8-1) | 2% |
| 3-HBB(3F)B-3 | (4-11-1) | 3% |
| 3-HBB(3F)B-4 | (4-11-1) | 3% |

NI=81.7° C.; Δn=0.102; η=28.3 mPa·s; Δ∈=−3.1.

Example 9

| | | |
|---|---|---|
| V-Npd1OB(2F,3F)-O2 | (1-1-1) | 10% |
| 3-HH-V | (2-1-1) | 20% |
| 3-HH-O3 | (2-1-1) | 3% |
| 3-H2B(2F,3F)-O2 | (3-1-2-1) | 8% |
| 5-H2B(2F,3F)-O2 | (3-1-2-1) | 8% |
| 3-HH1OB(2F,3F)-O2 | (3-1-6-1) | 5% |
| 4-HH1OB(2F,3F)-O2 | (3-1-6-1) | 5% |
| 1V-HH1OB(2F,3F)-O2 | (3-1-6-1) | 5% |
| 3-HBB(2F,3F)-O2 | (3-1-7-1) | 5% |
| 4-HBB(2F,3F)-O2 | (3-1-7-1) | 5% |
| 5-HBB(2F,3F)-O2 | (3-1-7-1) | 5% |
| 5-HH1OCro(7F,8F)-5 | (3-2-4-1) | 5% |
| 3-HB-O4 | (4-1-1) | 5% |
| 5-HB-O2 | (4-1-1) | 5% |
| V-HHB-1 | (4-3-1) | 3% |
| V-HHB-3 | (4-3-1) | 3% |

NI=81.0° C.; Tc≦−20° C.; Δn=0.094; η=26.4 mPa·s; Δ∈=−3.7.

Example 10

| | | |
|---|---|---|
| 3-Npd1OB(2F,3F)-O2 | (1-1-1) | 9% |
| 3-Npd1OB(2F,3F)B(2F,3F)-O4 | (1-2-1) | 5% |
| 3-HH-V | (2-1-1) | 24% |
| 3-HH-4 | (2-1-1) | 6% |
| 3-HH-5 | (2-1-1) | 3% |
| V-HB(2F,3F)-O2 | (3-1-1-1) | 8% |
| V-HB(2F,3F)-O3 | (3-1-1-1) | 3% |
| V-HB(2F,3F)-O4 | (3-1-1-1) | 2% |
| 3-HBB(2F,3F)-O2 | (3-1-7-1) | 8% |
| 4-HBB(2F,3F)-O2 | (3-1-7-1) | 4% |
| 5-HBB(2F,3F)-O2 | (3-1-7-1) | 6% |
| 2-BB(3F)B-3 | (4-5-1) | 4% |
| 2-BB(3F)B-5 | (4-5-1) | 4% |
| 1-BB(3F)B-2V | (4-5-1) | 4% |
| 3-HBB(3F)B-3 | (4-11-1) | 5% |
| 3-HBB(3F)B-4 | (4-11-1) | 5% |

NI=90.3° C.; Δn=0.123; η=28.2 mPa·s; Δ∈=−3.0.

Example 11

| | | |
|---|---|---|
| 4O-Npd1OB(2F,3F)B(2F,3F)-O2 | (1-2-1) | 5% |
| 3-HH-V | (2-1-1) | 25% |
| 3-HH-V1 | (2-1-1) | 5% |
| V-HB(2F,3F)-O2 | (3-1-1-1) | 15% |
| 3-HHB(2F,3F)-O2 | (3-1-4-1) | 5% |
| 5-HHB(2F,3F)-O2 | (3-1-4-1) | 5% |
| 3-HBB(2F,3F)-O2 | (3-1-7-1) | 8% |
| 5-HB-O2 | (4-1-1) | 4% |
| 3-HHB-1 | (4-3-1) | 6% |
| 3-HHB-O1 | (4-3-1) | 5% |
| 3-HHB-3 | (4-3-1) | 6% |
| V-HHB-1 | (4-3-1) | 5% |
| 3-HBB(3F)B-3 | (4-11-1) | 3% |
| 3-HBB(3F)B-4 | (4-11-1) | 3% |

NI=94.1° C.; Δn=0.099; η=21.2 mPa·s; Δ∈=−2.1.

Example 12

| | | |
|---|---|---|
| 3-Npd1OB(2F,3F)-O2 | (1-1-1) | 3% |
| 3-Npd1OB(2F,3F)-2V | (1-1-1) | 8% |
| 3-HH-V | (2-1-1) | 28% |
| 5-HB(2F,3F)-O2 | (3-1-1-1) | 15% |
| 3-HHB(2F,3F)-O2 | (3-1-4-1) | 5% |
| 5-HHB(2F,3F)-O2 | (3-1-4-1) | 5% |
| 3-HBB(2F,3F)-O2 | (3-1-7-1) | 9% |
| 4-HBB(2F,3F)-O2 | (3-1-7-1) | 9% |
| 3-HHB-3 | (4-3-1) | 2% |
| V-HHB-1 | (4-3-1) | 5% |
| 2-BB(3F)B-3 | (4-5-1) | 5% |
| 3-HB(3F)BH-3 | (4-10-1) | 3% |
| 5-HB(3F)BH-3 | (4-10-1) | 3% |

NI=89.8° C.; Δn=0.107; η=26.5 mPa·s; Δ∈=−2.6.

Example 13

| | | |
|---|---|---|
| 3-NpdH1OB(2F,3F)B(2F,3F)-O2 | (1-2-1) | 5% |
| 2O-Npd1OB(2F,3F)B(2F,3F)-1 | (1-2-1) | 5% |
| 3-HH-V | (2-1-1) | 29% |
| 2-H2H-5 | (2-2-1) | 3% |
| V-HB(2F,3F)-O4 | (3-1-1-1) | 9% |
| V-HB(2F,3F)-O4 | (3-1-1-1) | 12% |
| 3-HBB(2F,3F)-O2 | (3-1-7-1) | 5% |
| 4-HBB(2F,3F)-O2 | (3-1-7-1) | 8% |
| 3-HHB-1 | (4-3-1) | 5% |
| V-HHB-1 | (4-3-1) | 5% |
| 3-HHEH-3 | (4-6-1) | 4% |
| 3-HHEH-4 | (4-6-1) | 4% |
| 5-HBB(3F)B-2 | (4-11-1) | 6% |

NI=84.2° C.; Δn=0.094; η=27.8 mPa·s; Δ∈=−2.0.

The compositions in Examples 1 to 13 had a high maximum temperature and a small viscosity in comparison with those in Comparative Example 1. Thus, the liquid crystal composition of the invention was so much superior in characteristics to that described in the patent document No. 1.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A liquid crystal composition that has negative dielectric anisotropy, comprising two components, wherein a first component is at least one compound selected from the group of compounds represented by formula (1), and a second component is at least one compound selected from the group of compounds represented by formula (2):

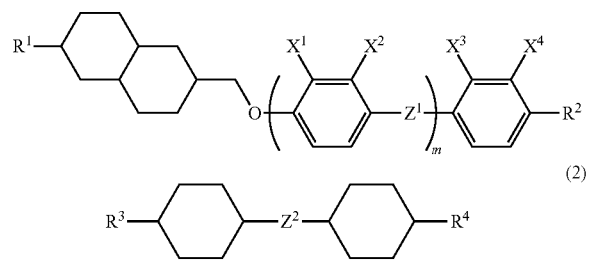

wherein $R^1$, $R^2$, $R^3$ and $R^4$ are each independently alkyl having 1 to 12 carbons, alkoxy having 1 to 12 carbons, alkenyl having 2 to 12 carbons, alkenyloxy having 2 to 11 carbons, or alkenyl having 2 to 12 carbons in which arbitrary hydrogen is replaced by fluorine; $X^1$ and $X^2$ are each independently hydrogen, fluorine or chlorine; $X^3$ and $X^4$ are each independently fluorine or chlorine; $Z^1$ and $Z^2$ are each independently a single bond, ethylene, methyleneoxy, oxymethylene, carbonyloxy or oxycarbonyl; and m is 0 or 1.

2. The liquid crystal composition according to claim 1, wherein the first component is at least one compound selected from the group of compounds represented by formula (1-1) and formula (1-2):

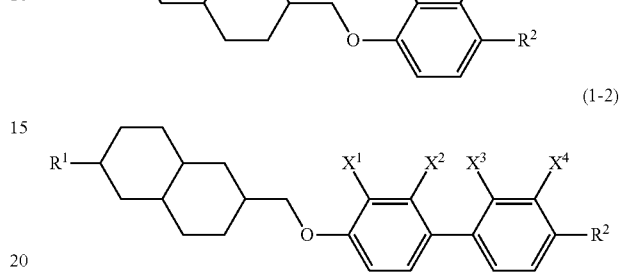

wherein $R^1$ and $R^2$ are each independently alkyl having 1 to 12 carbons, alkoxy having 1 to 12 carbons, alkenyl having 2 to 12 carbons, alkenyloxy having 2 to 11 carbons, or alkenyl having 2 to 12 carbons in which arbitrary hydrogen is replaced by fluorine; $X^1$ and $X^2$ are each independently hydrogen, fluorine or chlorine; and $X^3$ and $X^4$ are each independently fluorine or chlorine.

3. The liquid crystal composition according to claim 1 or 2, wherein the second component is at least one compound selected from the group of compounds represented by formula (2-1) and formula (2-2):

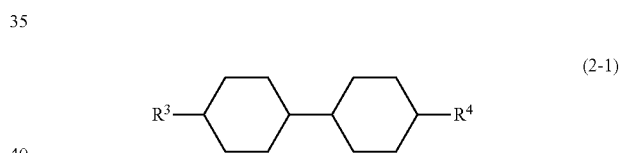

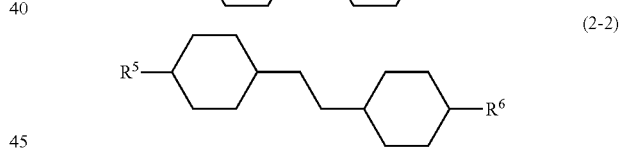

wherein $R^3$, $R^4$, $R^5$ and $R^6$ are each independently alkyl having 1 to 12 carbons, alkoxy having 1 to 12 carbons, alkenyl having 2 to 12 carbons, alkenyloxy having 2 to 11 carbons, or alkenyl having 2 to 12 carbons in which arbitrary hydrogen is replaced by fluorine.

4. The liquid crystal composition according to claim 3, wherein the second component is at least one compound selected from the group of compounds represented by formula (2-1).

5. The liquid crystal composition according to claim 1, wherein the ratio of the first component is in the range of approximately 5% to approximately 70% by weight and the ratio of the second component is in the range of approximately 25% to approximately 90% by weight, based on the total weight of the liquid crystal composition.

6. The liquid crystal composition according to claim 1, further comprising at least one compound selected from the group of compounds represented by formula (3-1) and formula (3-2) as a third component:

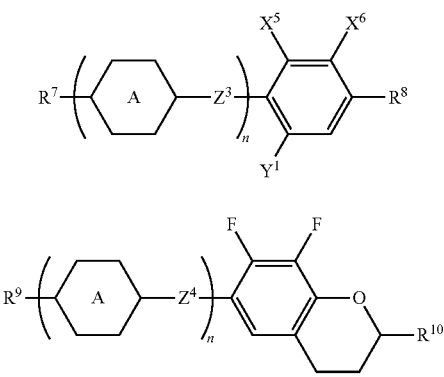

wherein $R^7$, $R^8$, $R^9$ and $R^{10}$ are each independently alkyl having 1 to 12 carbons, alkoxy having 1, to 12 carbons, alkenyl having 2 to 12 carbons, or alkenyl having 2 to 12 carbons in which arbitrary hydrogen is replaced by fluorine; $X^5$ and $X^6$ are each independently fluorine or chlorine; $Y^1$ is hydrogen or methyl; the ring A is independently 1,4-cyclohexylene in which arbitrary —$CH_2$— may be nonadjacently replaced by —O— or —S—, or 1,4-phenylene in which arbitrary hydrogen may be replaced by fluorine or chlorine; $Z^3$ and $Z^4$ are each independently a single bond, ethylene, methyleneoxy or carbonyloxy; and n is 1, 2 or 3.

7. The liquid crystal composition according to claim 6, wherein the third component is at least one compound selected from the group of compounds represented by formula (3-1-1) to formula (3-1-14) and formula (3-2-1) to formula (3-2-5):

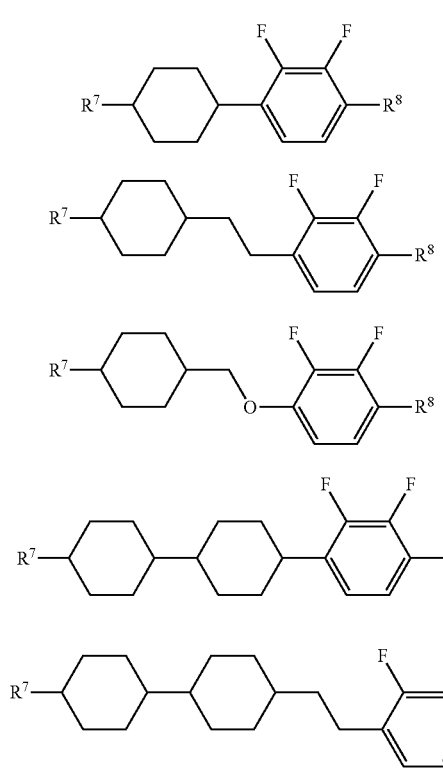

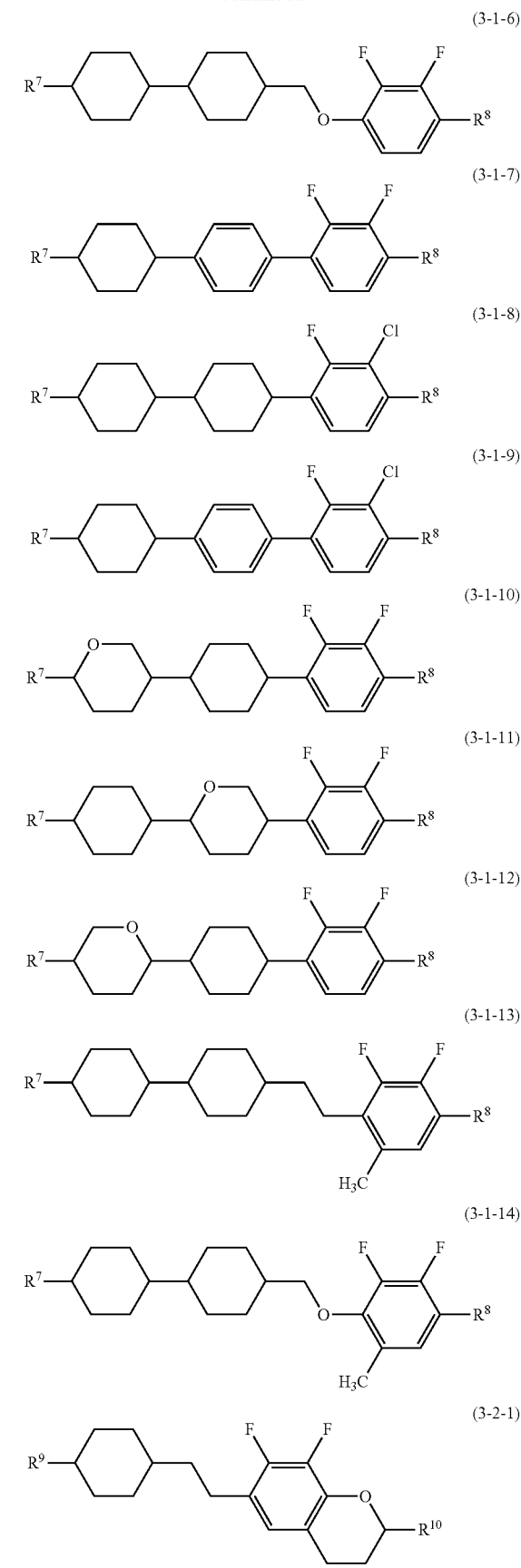

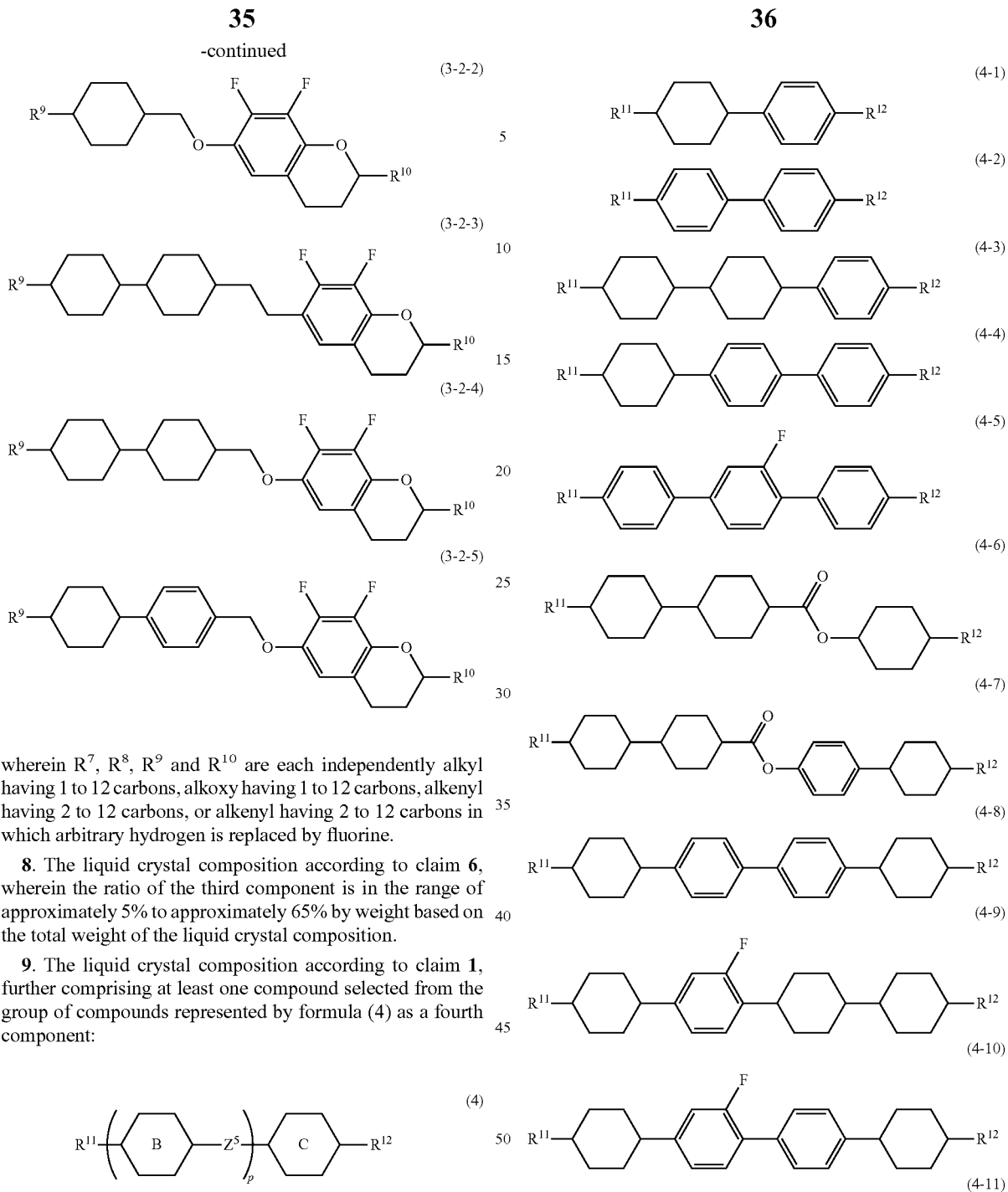

wherein $R^7$, $R^8$, $R^9$ and $R^{10}$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

8. The liquid crystal composition according to claim 6, wherein the ratio of the third component is in the range of approximately 5% to approximately 65% by weight based on the total weight of the liquid crystal composition.

9. The liquid crystal composition according to claim 1, further comprising at least one compound selected from the group of compounds represented by formula (4) as a fourth component:

wherein $R^{11}$ and $R^{12}$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring B and the ring C are each independently 1,4-cyclohexylene, 1,4-phenylene, 2-fluoro-1,4-phenylene or 3-fluoro-1,4-phenylene; the ring C is 1,4-phenylene when p is 1; $Z^5$ is independently a single bond, ethylene, methyleneoxy or carbonyloxy; and p is 1, 2 or 3.

10. The liquid crystal composition according to claim 9, wherein the fourth component is at least one compound selected from the group of compounds represented by formula (4-1) to formula (4-11):

wherein $R^{11}$ and $R^{12}$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

11. The liquid crystal composition according to claim 10, wherein the fourth component is at least one compound selected from the group of compounds represented by formula (4-3), formula (4-5) or formula (4-11).

12. The liquid crystal composition according to claim 9, wherein the ratio of the fourth component is in the range of approximately 5% to approximately 60% by weight based on the total weight of the liquid crystal composition.

13. The liquid crystal composition according to claim 6, further comprising at least one compound selected from the group of compounds represented by formula (4) as a fourth component:

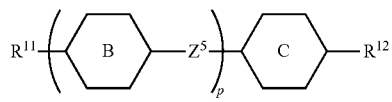

(4)

wherein $R^{11}$ and $R^{12}$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring B and the ring C are each independently 1,4-cyclohexylene, 1,4-phenylene, 2-fluoro-1,4-phenylene or 3-fluoro-1,4-phenylene; the ring C is 1,4-phenylene when p is 1; $Z^5$ is independently a single bond, ethylene, methyleneoxy or carbonyloxy; and p is 1, 2 or 3.

14. The liquid crystal composition according to claim 13, wherein the fourth component is at least one compound selected from the group of compounds represented by formula (4-1) to formula (4-11):

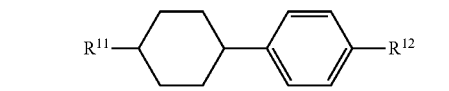 (4-1)

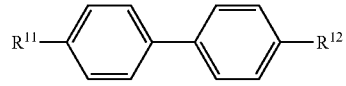 (4-2)

 (4-3)

 (4-4)

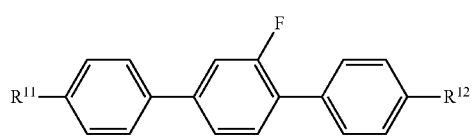 (4-5)

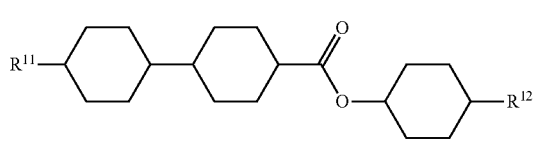 (4-6)

-continued

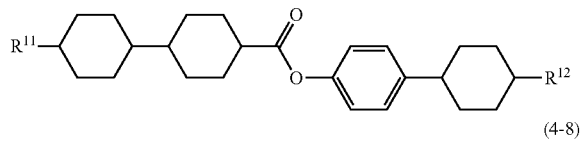 (4-7)

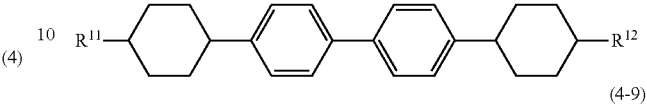 (4-8)

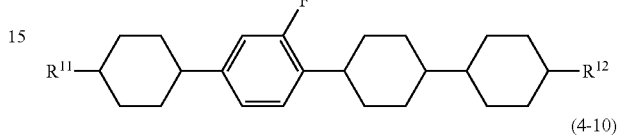 (4-9)

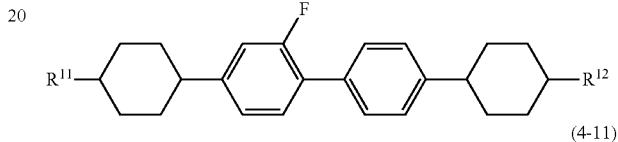 (4-10)

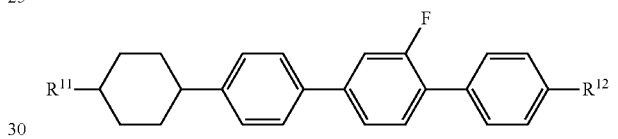 (4-11)

wherein $R^{11}$ and $R^{12}$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

15. The liquid crystal composition according to claim 14, wherein the fourth component is at least one compound selected from the group of compounds represented by formula (4-3), formula (4-5) and formula (4-11).

16. The liquid crystal composition according to claim 13, wherein the ratio of the fourth component is in the range of approximately 5% to approximately 60% by weight based on the total weight of the liquid crystal composition.

17. The liquid crystal composition according to claim 1, wherein the maximum temperature of a nematic phase is approximately 70° C. or higher, the optical anisotropy (25° C.) at a wavelength of 589 nanometers is approximately 0.08 or more, and the dielectric anisotropy (25° C.) at a frequency of 1 kHz is approximately −2 or less.

18. A liquid crystal display device containing the liquid crystal composition according to claim 1.

19. The liquid crystal display device according to claim 18, wherein an operating mode of the liquid crystal display device is a VA mode, an IPS mode or a PSA mode, and a driving mode of the liquid crystal display device is an active matrix mode.

* * * * *